(12) United States Patent
Draegen et al.

(10) Patent No.: US 10,897,460 B2
(45) Date of Patent: Jan. 19, 2021

(54) THIRD-PARTY DOCUMENTED TRUST LINKAGES FOR EMAIL STREAMS

(71) Applicants: Tim Draegen, Brevard, NC (US); Greg Kraios, Indianapolis, IN (US)

(72) Inventors: Tim Draegen, Brevard, NC (US); Greg Kraios, Indianapolis, IN (US)

( * ) Notice: Subject to any disclaimer, the term of this patent is extended or adjusted under 35 U.S.C. 154(b) by 0 days.

(21) Appl. No.: 14/880,774

(22) Filed: Oct. 12, 2015

(65) Prior Publication Data

US 2016/0142390 A1  May 19, 2016

Related U.S. Application Data

(60) Provisional application No. 62/062,342, filed on Oct. 10, 2014.

(51) Int. Cl.
*G06F 7/04* (2006.01)
*G06F 15/16* (2006.01)
*H04L 29/06* (2006.01)
*H04L 12/58* (2006.01)

(52) U.S. Cl.
CPC .............. *H04L 63/08* (2013.01); *H04L 51/12* (2013.01); *H04L 51/22* (2013.01)

(58) Field of Classification Search
CPC .......... H04L 63/08; H04L 51/12; H04L 51/22
See application file for complete search history.

(56) References Cited

U.S. PATENT DOCUMENTS

| | | | |
|---|---|---|---|
| 6,167,435 A * | 12/2000 | Druckenmiller | G06F 16/9535 709/206 |
| 7,181,764 B2 | 2/2007 | Zhu et al. | |
| 7,224,778 B2 | 5/2007 | Aoki | |
| 7,603,425 B2 | 10/2009 | DiPlacido et al. | |
| 7,685,414 B1 | 3/2010 | Appenzeller et al. | |
| 2002/0112013 A1 * | 8/2002 | Walsh | G06Q 30/0255 709/206 |
| 2002/0120600 A1 | 8/2002 | Schiavone et al. | |

(Continued)

OTHER PUBLICATIONS https://en.wikipedia.org/wiki/Opt-in_email, Opt-in email, Wikipedia, Sep. 16, 2015.

(Continued)

*Primary Examiner* — Darshan I Dhruv

(74) *Attorney, Agent, or Firm* — C. John Brannon; Brannon Sowers & Cracraft PC

(57) ABSTRACT

Methods, systems, and apparatus, including computer programs encoded on a computer storage medium, for establishing third-party documented trust linkages. In one aspect, a method includes receiving linkage context data from a sending user, creating a linkage context based on the linkage context data, sending the linkage context to the sending user, receiving linkage initiation data from the sending user, sending linkage initiation email based on the linkage initiation data to a recipient user, receiving confirmation opt-in data from the recipient user; and creating a trust linkage between the sending user and the recipient user, where the trust linkage allows the sending user to successfully send at least one future message stream and where the trust linkage allows the recipient user to successfully receive the at least one future message stream. Further aspects include testing trust linkages for processing message streams and destroying trust linkages to stop message streams.

15 Claims, 13 Drawing Sheets

(56) References Cited

U.S. PATENT DOCUMENTS

| | | | | |
|---|---|---|---|---|
| 2005/0138430 A1* | 6/2005 | Landsman | ............ | H04L 63/104 726/4 |
| 2005/0183142 A1 | 8/2005 | Podanoffsky | | |
| 2005/0289653 A1* | 12/2005 | Darling | ................ | H04L 9/3236 726/26 |
| 2006/0075040 A1* | 4/2006 | Chmaytelli | .......... | G06Q 10/107 709/206 |
| 2006/0212703 A1* | 9/2006 | Kojima | ................... | H04L 63/12 713/175 |
| 2008/0141026 A1* | 6/2008 | Cordery | ................ | H04L 9/3263 713/156 |
| 2008/0289019 A1* | 11/2008 | Lam | ........................ | G06F 21/41 726/9 |
| 2009/0013375 A1 | 1/2009 | MacIntosh et al. | | |
| 2009/0017847 A1* | 1/2009 | Mendiola | ................ | H04W 4/14 455/466 |
| 2009/0138711 A1* | 5/2009 | Heimbigner | ............ | H04L 51/12 713/170 |
| 2011/0252104 A1* | 10/2011 | Nachum | ................. | H04L 63/02 709/206 |
| 2015/0081825 A1 | 3/2015 | Patel | | |
| 2016/0007294 A1* | 1/2016 | Naslund | ................ | H04L 63/123 713/168 |
| 2016/0094566 A1* | 3/2016 | Parekh | ............... | H04L 63/0414 726/1 |

OTHER PUBLICATIONS https://blog.mailchimp.com/opt-in-vs-confirmed-opt-in-vs-double-opt-in/, Opt-in vs. Confirmed Opt-in vs. Double Opt-in, MailChimp, Aug. 14, 2005.

* cited by examiner

THIRD-PARTY DOCUMENTED TRUST LINKAGES FOR EMAIL STREAMS

CROSS-REFERENCE TO RELATED APPLICATIONS

This application claims the benefit under 35 U.S.C. § 119(e) of U.S. Provisional Patent Application No. 62/062,342, entitled "THIRD PARTY CREATED DOCUMENTED LINKAGE BETWEEN A RECIPIENT MAILBOX AND AN EMAIL STREAM," filed Oct. 10, 2014, which is incorporated herein by reference in its entirety.

BACKGROUND

This specification relates to the field of software. More specifically, the present technology is in the technical field of trust-authenticated electronic mail (email).

The inexpensive economics of email make the email medium ideal for the wide distribution of malware and unsolicited commercial email, along with the distribution of legitimate and/or desired email. Internet users are free to publish or give their email address to anyone and typically expect to receive email in a timely manner. Mailbox providers (often referred to as Internet service providers or webmail providers) sit between email senders and Internet users. Mailbox providers may sometimes perform basic filtering decisions when determining whether or not to deliver email to an Internet user's mailbox. However, mailbox providers lack a means to determine independently if an email sender has permission from the Internet user to send the message, and by corollary also lacks a means to determine if said permission has been revoked.

The present novel technology addresses these needs.

SUMMARY

This specification describes technologies relating to trust-based email.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

As used in the specification and the claims, the singular forms "a," "an" and the include plural referents unless the context clearly dictates otherwise. Ranges may be expressed in ways including from "about" one particular value, and/or to "about" another particular value. When such a range is expressed, another implementation may include from the one particular value and/or to the other particular value. Similarly, when values are expressed as approximations, for example by use of the antecedent "about," it will be understood that the particular value forms another implementation. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. Similarly, "typical" or "typically" means that the subsequently described event or circumstance often though may not occur, and that the description includes instances where said event or circumstance occurs and instances where it does not. Additionally, "generates," "populates," "generating," and "populating" mean that the trust linkage system 105, client, end user (user, system user, email sender, email recipient), and/or module may produce some event or cause some event element to be produced. For example, a webpage may receive data to display in whole or in part to a list of subscriptions to which the end user has and/or may consent, the webpage may pull such data from a source other than the trust linkage system 105 (e.g., other servers, intermediaries, etc.), and/or the like.

Figure 1:
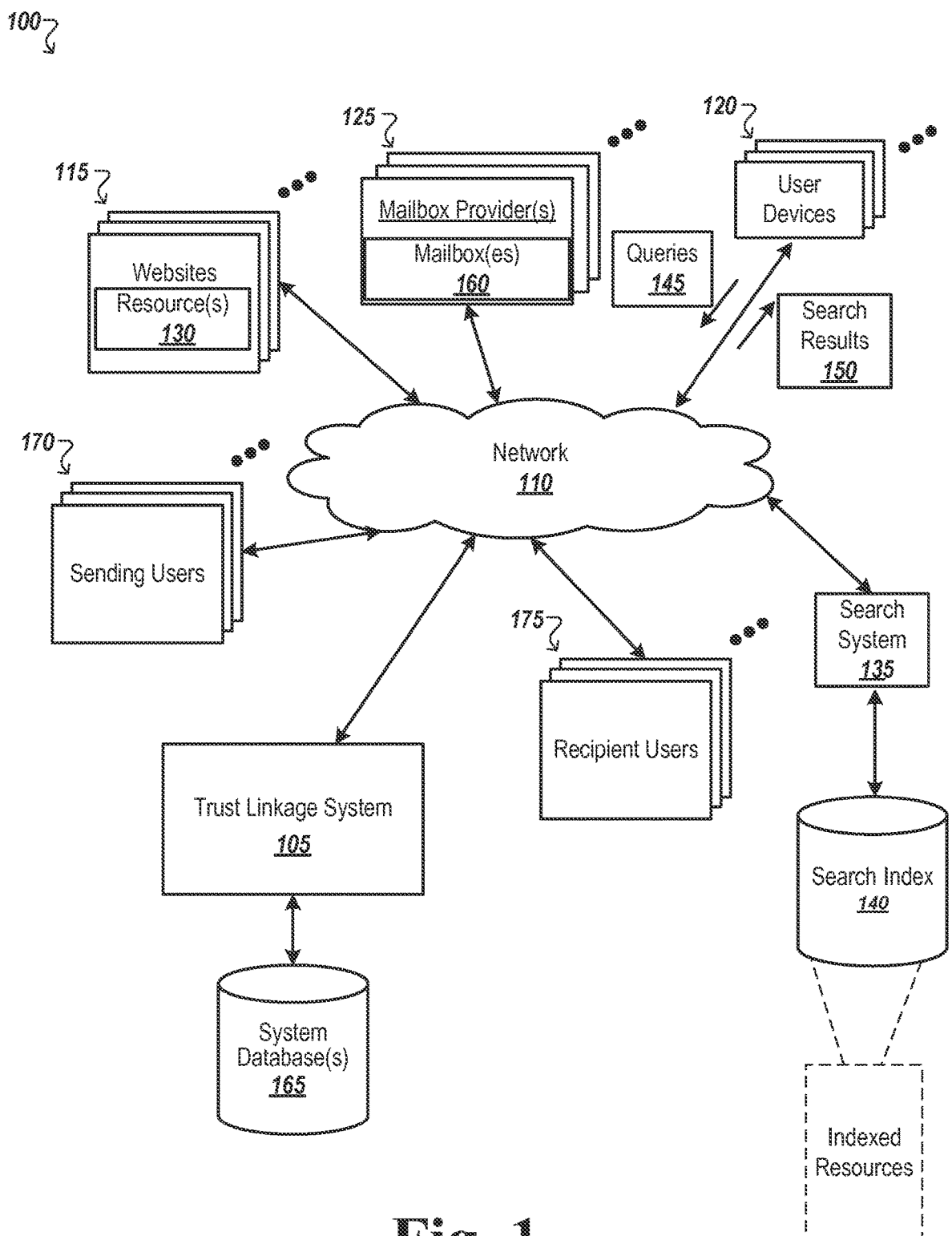
FIG. 1 is a block diagram of an example environment in which the trust linkage system may exist.

FIG. 1 is a block diagram of an example environment 100 in which trust linkage system 105 may exist. Environment 100 may typically include trust linkage system 105; network 110; website(s) 115; end user device(s) 120; mailbox provider(s) 125, resource(s) 130; search system 135; search index 140; queries 145; search result(s) 150; mailbox(es) 160, system database(s) 165, sending user(s) 170, and/or recipient user(s) 175. Trust linkage system 105 typically may facilitate verifiable consent-based filtering of email between email senders and email recipients. Example environment 100 also includes network 110, such as a local area network (LAN), a wide area network (WAN), the Internet, or a combination thereof. Network 110 may connect websites 115, end user device(s) 120, and/or trust linkage system 105. Example environment 100 may potentially include many thousands of website(s) 115 and/or end user device(s) 120.

Website(s) 115 may be one or more resources 130 associated with a domain name and hosted by one or more servers. An example website(s) 115 may be a collection of webpages formatted in hypertext markup language (HTML) that may contain text, images, multimedia content, and programming elements, such as scripts. Each website(s) 115 may be maintained by a publisher, which may be an entity that controls, manages, and/or owns each website(s) 115.

Resource(s) 130 may be any data that may be provided over the network 110. A resource(s) 130 may be identified by a resource address (e.g., a URL) that may be associated with the resource(s) 130. Resources 130 include HTML webpages, word processing documents, and portable document format (PDF) documents, images, video, and feed sources, to name only a few. Resources 130 may include content, such as words, phrases, images and sounds, that may include embedded information—such as meta-information in hyperlinks—and/or embedded instructions, such as JAVASCRIPT scripts (JAVASCRIPT is a registered trademark of Oracle America, Inc., a Delaware corporation, located at 500 Oracle Parkway, Redwood Shores, Calif. 94065). Units of content—for example, data files, scripts, content files, or other digital data—that may be presented in (or with) resources may be referred to as content items. Resource(s) 130 and/or website(s) 115 may, for example, be used to create subscription management user interfaces 900, embedded in email data streams, and/or the like.

End user devices 120 may be electronic devices that may be under the control of an end user and may be capable of requesting and receiving resources 130 over network 110. Example end user devices 120 include personal computers, mobile communication devices, and other devices that may send and receive data over network 110. End user devices 120 typically include a user application, such as a web browser, to facilitate the sending and receiving of data over the network 110.

In some implementations, websites 115 (apps, client services; hereinafter simply "websites" for ease of use), end user devices 120, mailbox provider(s) 125, sending user(s) 170, recipient user(s) 175, and/or system 105 may directly intercommunicate, excluding the need for the Internet from the scope of a network 110. For example, the websites 115, end user devices 120, and the trust linkage system 105 may directly communicate over device-to-device (D2D) communication protocols (e.g., WI-FI DIRECT (WI-FI DIRECT is a registered trademark of Wi-Fi Alliance, a California corporation, located at 10900-B Stonelake Boulevard, Suite 126, Austin, Tex. 78759); Long Term Evolution (LTE) D2D (LTE is a registered trademark of Institut Europeen des Normes; a French nonprofit telecommunication association, located at 650 route des Lucioles, F-06921, Sophia Antipolis, France), LTE Advanced (LTE-A) D2D, etc.), wireless wide area networks, and/or satellite links thus eliminate the need for the network 110 entirely. In other implementations, websites 115, end user devices 120, mailbox provider(s) 125, sending user(s) 170, recipient user(s) 175, and/or system 105 may communicate indirectly to the exclusion of the Internet from the scope of the network 110 by communicating over wireless wide area networks and/or satellite links. Further, end user devices 120 may similarly send and receive search queries 145 and search results 150 indirectly or directly. End user devices 120 typically may be used by sending user(s) 170, recipient user(s) 175, and/or other entities to communicate, process data, and/or perform a plurality of other functions. Within the context of system 105, sending user(s) 170 typically may be users that send email data streams (e.g., subscriptions, newsletters, and/or the like), and recipient user(s) 175 typically may be users that receive those email data streams. Recipient user(s) 175 typically may receive those email data streams at one or more mailboxes 160 located directly and/or indirectly on one or more mailbox provider(s) 125.

In wireless wide area networks, communication primarily occurs through the transmission of radio signals over analog, digital cellular, or personal communications service (PCS) networks. Signals may also be transmitted through microwaves and other electromagnetic waves. At the present time, most wireless data communication takes place across cellular systems using second generation technology such as code-division multiple access (CDMA), time division multiple access (TDMA), the Global System for Mobile Communications (GSM) (GSM is a registered trademark of GSM MoU Association, a Swiss association, located at Third Floor Block 2, Deansgrande Business Park, Deansgrande, Co Dublin, Ireland), Third Generation (wideband or 3G), Fourth Generation (broadband or 4G), personal digital cellular (PDC), or through packet-data technology over analog systems such as cellular digital packet data (CDPD) used on the Advance Mobile Phone System (AMPS).

The terms "wireless application protocol" and/or "WAP" mean a universal specification to facilitate the delivery and presentation of web-based data on handheld and mobile devices with small user interfaces. "Mobile Software" refers to the software operating system that allows for application programs to be implemented on a mobile device such as a mobile telephone or PDA. Examples of Mobile Software are JAVA and JAVA ME (JAVA and JAVA ME are trademarks of Oracle America, Inc., a Delaware corporation, located at 500 Oracle Parkway, Redwood Shores, Calif. 94065), BREW (BREW is a registered trademark of Qualcomm Incorporated of San Diego, Calif.), WINDOWS Mobile (WINDOWS is a registered trademark of Microsoft Corporation of Redmond, Wash.), PALM OS (PALM is a registered trademark of Palm, Inc. of Sunnyvale, Calif.), SYMBIAN OS (SYMBIAN is a registered trademark of Symbian Software Limited Corporation of London, United Kingdom), ANDROID OS (ANDROID is a registered trademark of Google, Inc. of Mountain View, Calif.), and IPHONE OS (IPHONE is a registered trademark of Apple, Inc. of Cupertino, Calif.), and WINDOWS PHONE 7 (WINDOWS PHONE is a registered trademark the Microsoft Corporation of Redmond, Wash.). "Mobile Apps" refers to software programs written for execution with Mobile Software.

The trust linkage system 105 may use one or more modules to perform various functions including, but not limited to, searching, analyzing, querying, interfacing, etc. A "module" refers to a portion of a computer system and/or software program that carries out one or more specific functions and may be used alone or combined with other modules of the same system or program. For example, a module may be located on the trust linkage system 105 (e.g., on the servers of system 105, i.e., server-side module), on end user devices 120, or on an intermediary device (e.g., the client server, i.e., a client-side module; another end user device(s) 120; a different server on the network 110; or any other machine capable of direct or indirect communication with system 105, websites 115, the search system 135, and/or the end user devices 120.)

In some implementations, the system 105 may be performed through a system 105 module. For example, a user may install a program to interface with a system 105 server to communicate data, interactions, and trust linkage information to/from the user's end user device(s) 120. In some other implementations, the system 105 may be installed on a user's machine and operate—in whole or in part—independently of system 105 WAN and/or LAN components. For example, the system 105 software may be deployed to a user's computer as a standalone program that interfaces with the user's computer, creates and maintains data store(s), maintains/processes subscription data, maintains/processes trust linkage data, filters/transfers email, etc. In another example, the system 105 may interact with and/or be installed as an Internet browser extension. For example, the system 105 may be a program installed as an extension, add-on, and/or plugin of GOOGLE CHROME (GOOGLE CHROME is a registered trademark of Google, Inc., a Delaware corporation, located at 1600 Amphitheatre Parkway, Mountain View, Calif. 94043); MOZILLA FIREFOX (MOZILLA and FIREFOX are registered trademarks of the Mozilla Foundation, a California non-profit corporation, located at 313 East Evelyn Avenue, Mountain View, Calif. 94041); APPLE SAFARI (APPLE and SAFARI are registered trademarks of Apple, Inc., a California corporation, located at 1 Infinite Loop, Cupertino, Calif. 95014), etc. The browser extension may query subscription lists, query/maintain/process trust linkage data, query/maintain/process email, communicate with data store(s), analyze trust linkage data, communicate with third-party servers (e.g., mailbox providers), etc.

Typically, modules may be coded in JAVASCRIPT, PHP, or HTML, but may be created using any known programming language (e.g., BASIC, FORTRAN, C, C++, C#, PERL (PERL is a registered trademark of Yet Another Society DBA The Perl Foundation, a Michigan nonprofit corporation, located at 340 S. Lemon Ave. #6055, Walnut, Calif. 91789)) and/or package (e.g., compressed file (e.g., zip, gzip, 7zip, RAR (RAR is a registered trademark of Alexander Roshal, an individual, located in the Russian Federation AlgoComp Ltd., Kosareva 52b-83, Chelyabinsk, Russian Federation 454106), etc.), executable, etc.).

In some implementations, the trust linkage system 105 may be packaged, distributed, scripted, installed by a technician of system 105, and/or otherwise deployed to a client server location such that system 105 exists within the client server and/or client server network, either in whole or in part. For example, the trust linkage system 105 may be scripted and/or packaged into an executable package and downloaded by a client administrator; the client administrator then installing system 105 software package(s) onto the client server(s). Such setups may allow the trust linkage system 105 to operate all system 105 operations entirely within the client server(s) and/or client network, excluding the need to interface with system 105 provider's servers for some or all system 105 functions. Such an implementation may, for example, be used to reduce bandwidth, latency, complexity of network management, etc. In some other implementations, the client servers may facilitate only some of system 105 functions and interface with system 105 servers (over a network or directly) to enable those remaining functions. Still other implementations may link to system 105 servers to obtain updates, patches, and/or other modifications to system 105 distributions.

Trust linkage system 105 software distributions may, in some implementations, be installed in a virtual environment (e.g., HYPER-V (HYPER-V is a registered trademark of Microsoft, a Washington Corporation, located at One Microsoft Way, Redmond, Wash. 98052); VIRTUALBOX (VIRTUALBOX is a registered trademark of Oracle America, Inc., a Delaware corporation, located at 500 Oracle Parkway, Redwood Shores, Calif. 94065); VMWARE (VMWARE is a registered trademark of VMWare, Inc., a Delaware corporation, located at 3401 Hillview Ave., Palo Alto, Calif. 94304), etc.).

In other implementations, trust linkage system 105 software may be installed in whole or in part on an intermediary system that may be separate from the client and system 105 servers. For example, trust linkage system 105 software may be installed by an intermediary worker, a client worker, and/or a system 105 worker onto a hosting service (e.g., AMAZON WEB SERVICES (AWS) (AWS is a registered trademark of Amazon Technologies, Inc., a Nevada corporation, located at PO Box 8102, Reno, Nev. 89507), RACKSPACE (RACKSPACE is a registered trademark of Rackspace US, Inc., a Delaware corporation, located at 1 Fanatical Place, City of Windcrest, San Antonio, Tex. 78218), etc. The client may then connect to the intermediary and/or system 105 servers to access system 105 functions. Such implementations may, for example, allow distributed access, redundancy, decreased latency, etc.

End user device(s) 120 may request resources 130 from website(s) 115. In turn, data representing resource(s) 130 may be provided to end user device(s) 120 for presentation by end user device(s) 120. Data representing resource(s) 130 may also include data specifying a portion of the resource(s) 130 or a portion of a user display—for example, a small search text box or a presentation location of a pop-up window—in which advertisements or third-party search tools may be presented.

To facilitate searching of resource(s) 130, environment 100 may include a search system 135 that identifies resource(s) 130 by crawling and indexing resource(s) 130 provided by publishers on website(s) 115. Data about resource(s) 130 may be indexed based on resource(s) 130 to which the data corresponds. The indexed and, optionally, cached copies of resource(s) 130 may be stored in, for example, search index 140.

End user device(s) 120 may submit search queries 145 to search system 135 over network 110. In response, search system 135 accesses search index 140 to identify resource(s) 130 that may be relevant to search query 145. Search system 135 identifies the resources 130 in the form of search result(s) 150 and returns the search result(s) 150 to end user devices 120 in search results webpages. A search result(s) 150 may be data generated by the search system 135 that identifies a resource(s) 130 that may be responsive to a particular search query, and includes a link to the resource(s) 130. An example search result(s) 150 may include a webpage title, a snippet of text or a portion of an image extracted from the webpage, and the URL of the webpage.

Users that may be interested in a particular subject may perform a search by submitting one or more queries 145 to search system 135 in an effort to identify related information. For example, a user that may be interested sports may submit queries 145 such as "news list," "sports bulletin," or "technology brief." In response to each of these queries 145, the user may be provided search result(s) 150 that have been identified as responsive to the search query—that is, have at least a minimum threshold relevance to the search query, for example, based on cosine similarity measures or clustering techniques. The user may then select one or more of the search result(s) 150 to request presentation of a webpage or other resource(s) 130 that may be referenced by a URL associated with the search result(s) 150.

Other implementations of the trust linkage system 105 may allow for a game-like components, or gamification, aspect to interaction with system 105. For example, tangible (e.g., money, goods, etc.) and/or intangible (e.g., account badges, user name flair, etc.) rewards may be given to users who frequently interact with system 105, users who have activated certain thresholds of subscriptions on system 105, etc.

When search result(s) 150 are requested by an end user device(s) 120, the trust linkage system 105 may receive a request for data to be provided with the resource(s) 130 or search results 150. In response to the request, the trust linkage system 105 selects data that are determined to be relevant to the search query. In turn, the selected data are provided to the end user device(s) 120 for presentation with the search results 150.

For example, in response to the search query "sports," system 105 may present the user with relevant sports-related results. If the user selects—for example, by clicking or touching—search result(s) 150, the end user device(s) 120 may be redirected, for example, to a webpage containing one or more sports-related subscriptions that a user may give opt-in/opt-out consent for email. This webpage may include, for example, subscription lists, subscription names, email frequency, etc.

The environment 100 may also include a system database(s) 165 to receive and record information regarding the trust linkage system 105, website(s) 115, end user devices 120, and/or any other data useful to environment 100. For example, information regarding end user devices 120 and end user identifiers may be stored and analyzed to determine user activity on website(s) 115 and/or system 105.

In some implementations, data that may be stored in the system database(s) 165 may be anonymized to protect the identity of the user with which the user data may be associated. For example, user identifiers may be removed from the user data to provide to third-party clients. Alternatively, the user data may be associated with a hash value of the user identifier to anonymize the user identifier. In some implementations, data are only stored for users that opt-in to having their data stored. For example, a user may be provided an opt-in/opt-out user interface that allows the user to specify whether they approve storage of data associated with the user.

While system 105 may operate with only one of each component (e.g., one system 105, one website 115, one end user, one end user device 120, etc.), system 105 may be benefitted by multiple of these components (and/or in some instances greatly benefitted by a mass amount of said components). For example, the existence and activity of a plurality of users on system 105 may foster greater subscription suggestion accuracy for system 105 as compared to a static, low user system. Additionally, features such as game-like interaction of system 105 may be difficult or impossible without at least a small plurality of active competitors on system 105; however, as the number of active users increases, the likelihood of a successful ecosystem for the game-like system 105 features also increases and may tend to lead to greater success of system 105 and user activity (quantity and quality) compared to a small user base.

Figure 2:
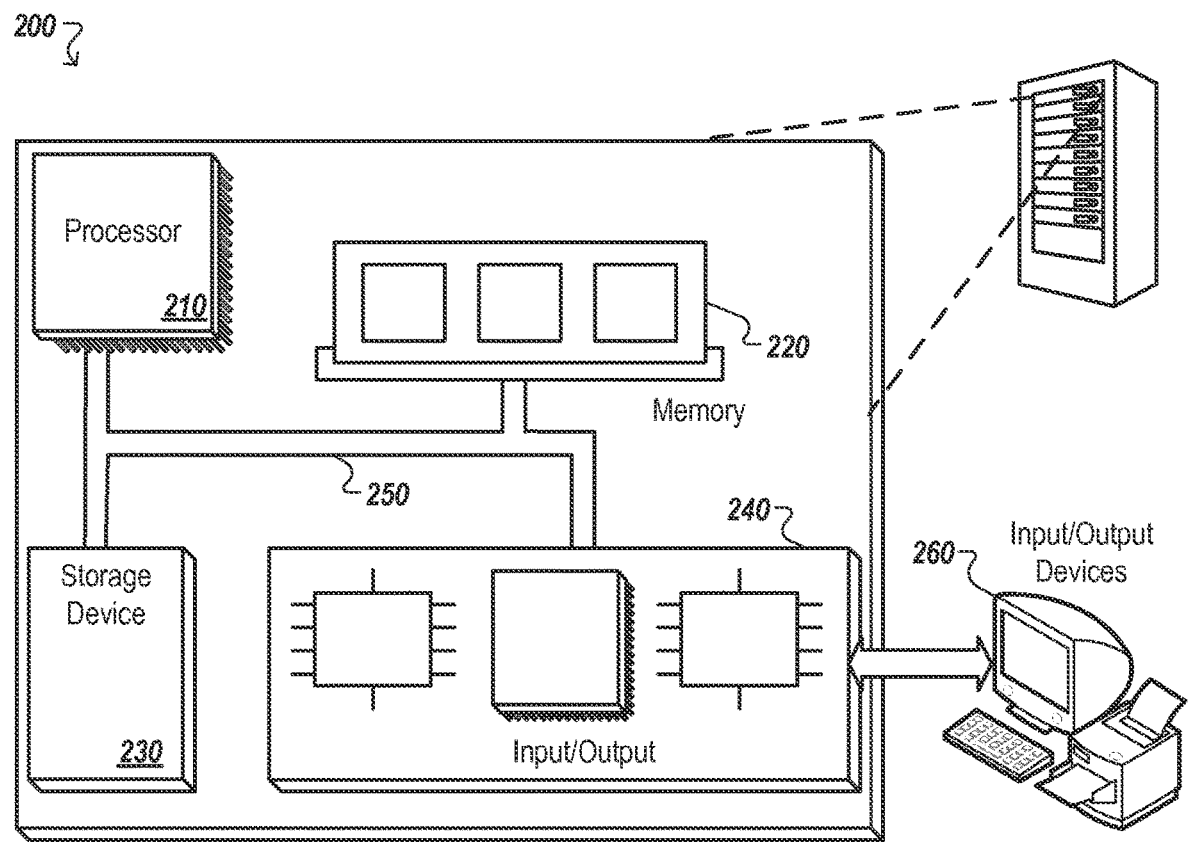
FIG. 2 is a system diagram of an example computer system that may be used to create the trust linkage system.

FIG. 2 is a block diagram of an example computer system 200 that may be used to provide trust linkage system 105, as described above. The computer system 200 may typically include processor(s) 210; memory 220; storage device(s) 230; system input(s)/output(s) 240; system bus(es) 250; and input/output device(s) 260. Each of the components 210, 220, 230, and 240 typically may be interconnected, for example, using system bus(es) 250. Processor(s) 210 may be capable of processing instructions for execution within the system 200. In one implementation, processor(s) 210 may be a single-threaded processor. In another implementation, processor(s) 210 may be a multi-threaded processor. In yet another implementation, processor(s) 210 may be a single-core processor, a multiple-core processor, and/or multiple processors (i.e., more than one socketed processor). Processor(s) 210 typically may be capable of processing instructions stored in the memory 220 and/or on the storage device(s) 230.

Memory 220 stores information within system 200. In one implementation, memory 220 may be a computer-readable medium. In one other implementation, memory 220 may be a volatile memory unit. In another implementation, memory 220 may be a nonvolatile memory unit.

Storage device(s) 230 may be capable of providing mass storage for the system 200. In one implementation, storage device(s) 230 may be a computer-readable medium. In various different implementations, storage device(s) 230 may include, for example, a hard disk device, a solid-state disk device, an optical disk device, and/or some other large capacity storage device.

System input(s)/output(s) 240 provide input/output operations for the system 200. In one implementation, system input(s)/output(s) 240 may include one or more of a network interface devices, for example an Ethernet card; a serial communication device, for example an RS-232 port; and/or a wireless interface device, for example an IEEE 802.11 card. In another implementation, system input(s)/output(s) 240 may include driver devices configured to receive input data and send output data to other input/output device(s) 260, for example keyboards, printers, display devices, and/or any other input/output device(s) 260. Other implementations, however, may also be used, such as mobile computing devices, mobile communication devices, set-top box television client devices, etc.

Although an example processing system has been described in FIG. 1, implementations of the subject matter and the functional operations described in this specification may be implemented in other types of digital electronic circuitry, or in computer software, firmware, or hardware, including the structures disclosed in this specification and their structural equivalents, or in combinations of one or more of them.

Embodiments of the subject matter and the operations described in this specification may be implemented as a method, in digital electronic circuitry, or in computer software, firmware, or hardware, including the structures disclosed in this specification and their structural equivalents, or in combinations of one or more of them. Embodiments of the subject matter described in this specification may be implemented as one or more computer programs—that is, one or more modules of computer program instructions encoded on computer storage medium for execution by, or to control the operation of, data processing apparatus. Alternatively or in addition, the program instructions may be encoded on an artificially-generated propagated signal, for example a machine-generated electrical, optical, or electromagnetic signal, which may be generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium may not be a propagated signal, a computer storage medium may be a source or destination of computer program instructions encoded in an artificially-generated propagated signal. The computer storage medium may also be, or be included in, one or more separate physical components or media (e.g., multiple CDs, disks, or other storage devices).

The operations described in this specification may be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus may include special purpose logic circuitry, for example an field programmable gate array (FPGA) or an application-specific integrated circuit (ASIC). The apparatus may also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing, and grid computing infrastructures.

A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program can, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, for example an FPGA or an ASIC.

Processors suitable for the execution of a computer program include, by way of example, both general and special purpose microprocessors, and any one or more processors of any kind of digital computer. Typically, a processor may receive instructions and data from a read-only memory or a random access memory or both. The essential elements of a computer are a processor for performing actions in accordance with instructions and one or more memory devices for storing instructions and data. Typically, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, for example a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, for example erasable programmable read-only memory (EPROM), electrically erasable programmable read-only memory (EEPROM), and/or flash memory devices; magnetic disks, for example internal hard disks or removable disks; magneto-optical disks; and/or compact disk read-only memory (CD-ROM) and digital video disk real-only memory (DVD-ROM) disks. The processor and the memory may be supplemented by, or incorporated in, special purpose logic circuitry.

To provide for interaction with a user, embodiments of the subject matter described in this specification may be implemented on a computer having a display device (e.g., a cathode ray tube (CRT), liquid crystal display (LCD), or organic light-emitting diode (OLED) monitor), for displaying information to the user and a keyboard and a pointing device, e.g., a mouse or a trackball, by which the user may provide input to the computer. These may, for example, be desktop computers, laptop computers, smart TVs, etc. Other mechanisms of input may include portable and or console entertainment systems such as GAME BOY and/or NINTENDO DS ((GAME BOY, GAME BOY COLOR, GAME BOY ADVANCE, NINTENDO DS, NINTENDO 2DS, and NINTENDO 3DS are registered trademarks of Nintendo of America Inc., a Washington corporation, located at 4600 150th Avenue NE, Redmond, Wash. 98052), IPOD (IPOD is a registered trademark of Apple Inc., a California corporation, located at 1 Infinite Loop, Cupertino, Calif. 95014), XBOX (e.g., XBOX, XBOX ONE) (XBOX and XBOX ONE are a registered trademarks of Microsoft, a Washington corporation, located at One Microsoft Way, Redmond, Wash. 98052), PLAYSTATION (e.g., PLAYSTATION, PLAYSTATION 2, PS3, PS4, PLAYSTATION VITA) (PLAYSTATION, PLAYSTATION 2, PS3, PS4, and PLAYSTATION VITA are registered trademarks of Kabushiki Kaisha Sony Computer Entertainment TA, Sony Computer Entertainment Inc., a Japanese corporation, located at 1-7-1 Konan Minato-ku, Tokyo, 108-0075, Japan), OUYA (OUYA is a registered trademark of Ouya Inc., a Delaware corporation, located at 12243 Shetland Lane, Los Angeles, Calif. 90949), WII (e.g., WII, WII U) (WII and WII U are registered trademarks of Nintendo of America Inc., a Washington corporation, located at 4600 150th Avenue NE, Redmond, Wash. 98052), etc.

Other kinds of devices may be used to provide for interaction with a user as well; for example, feedback provided to the user may be any form of sensory feedback, for example visual feedback, auditory feedback, or tactile feedback; and input from the user may be received in any form, including acoustic, speech, or tactile input. In addition, a computer may interact with a user by sending documents to and receiving documents from a device that may be used by the user; for example, by sending webpages to a web browser on a user's client device in response to requests received from the web browser.

Some embodiments of the subject matter described in this specification may be implemented in a computing system 200 that includes a back-end component (e.g., a data server) or that includes a middleware component (e.g., an application server) or that includes a front-end component (e.g., a client computer having a graphical user interface or a Web browser through which a user may interact with an implementation of the subject matter described in this specification) or any combination of one or more such back-end, middleware, or front-end components. The components of the computing system 200 may be interconnected by any form or medium of digital data communication, for example a communication network. Examples of communication networks include a local area network (LAN) and a wide area network (WAN), an inter-network (e.g., the Internet), and peer-to-peer networks (e.g., ad-hoc peer-to-peer, direct peer-to-peer, decentralized peer-to-peer, centralized peer-to-peer, etc.).

The computing system 200 may include clients and servers. A client and server are typically remote from each other and typically interact through a communication network. The relationship of client and server arises by virtue of computer programs running on the respective computers and having a client-server relationship to each other. In some embodiments, a server transmits data (e.g., an HTML webpage) to a client device (e.g., for purposes of displaying data to and receiving user input from a user interacting with the client device). Data generated at the client device (e.g., a result of the user interaction) may be received from the client device at the server.

Figure 3A:
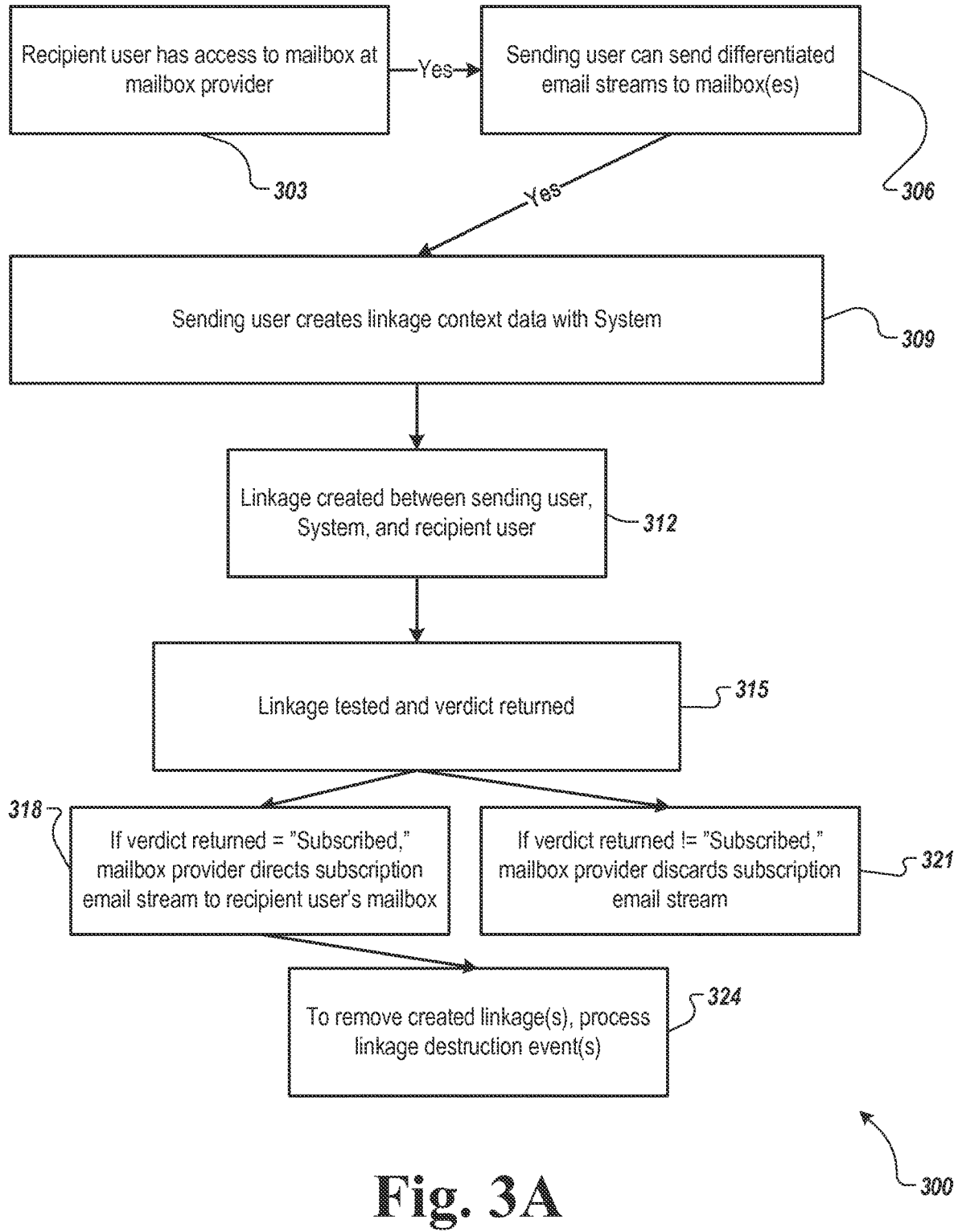
FIG. 3A depicts a process flow chart associated with use of the trust linkage system.
Figure 3B:
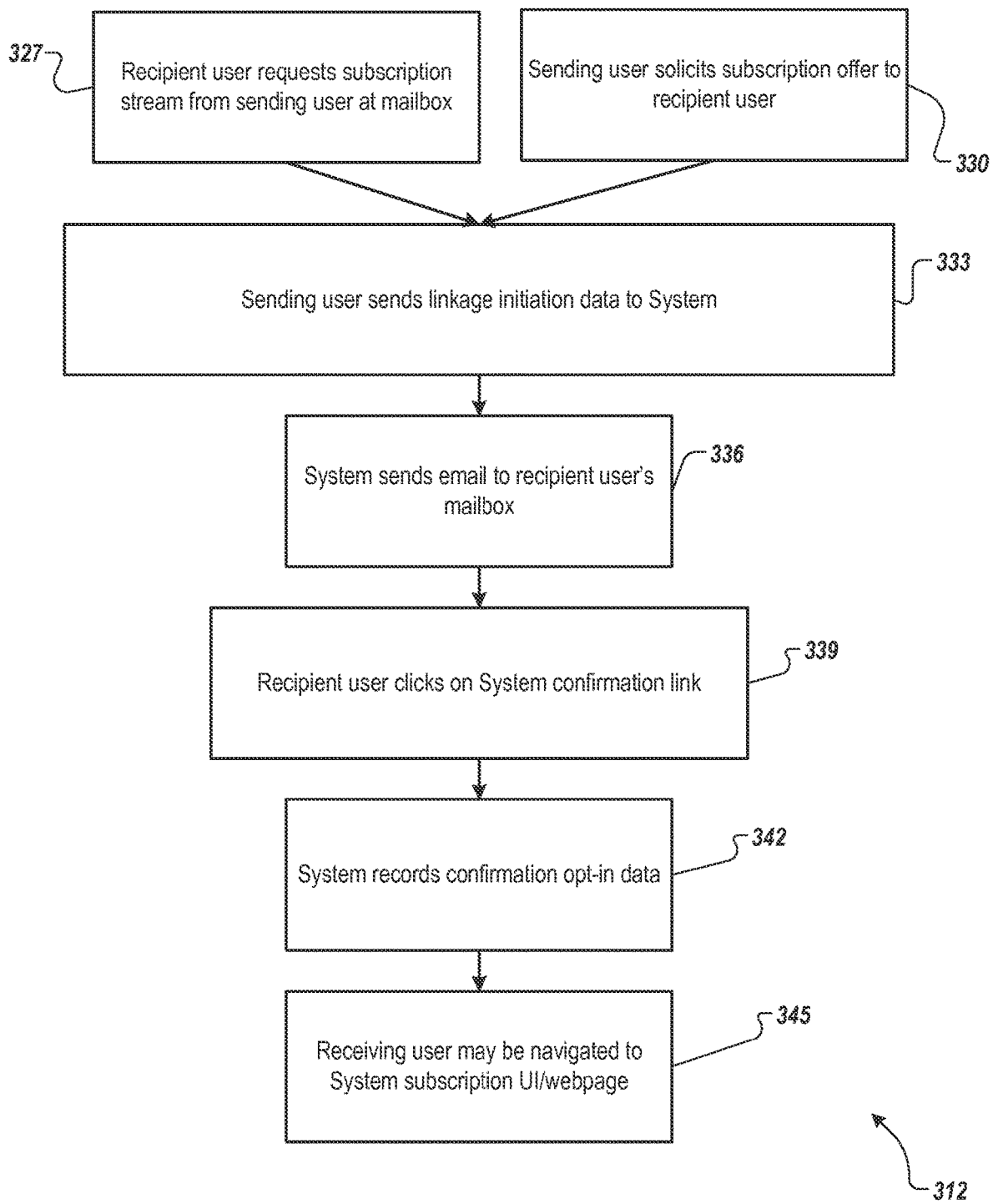
FIG. 3B depicts a second process flow chart associated with use of the trust linkage system, specifically creating trust linkages.
Figure 3C:
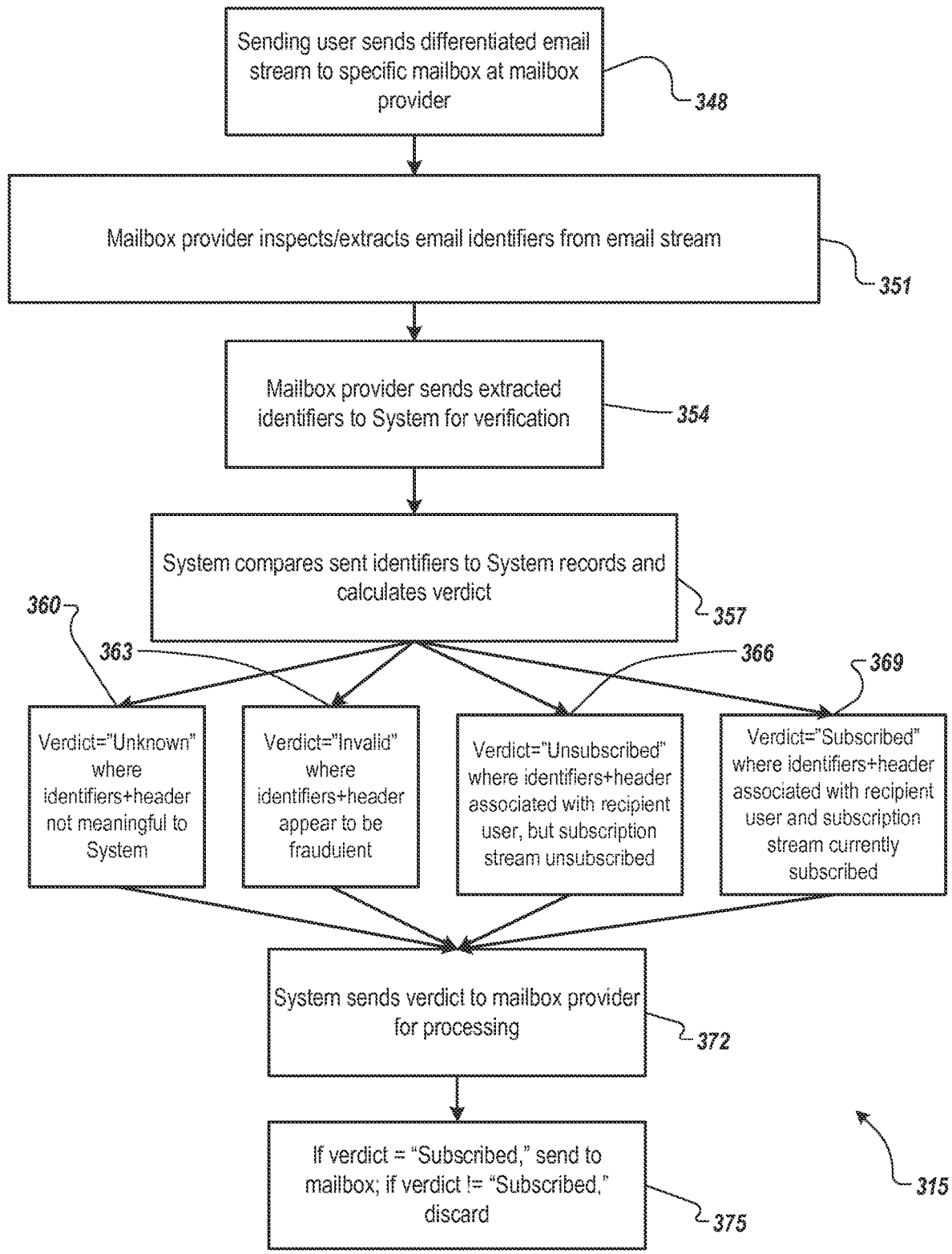
FIG. 3C depicts a third process flow chart associated with use of the trust linkage system, specifically testing trust linkages.

FIGS. 3A-3C depict process flow charts associated with use of the trust linkage system 105. Specifically, FIG. 3A typically depicts system usage process flow 300 and steps including 'recipient user has access to mailbox at mailbox provider' 303, 'sending user can send differentiated email streams to mailbox(es)' 306, 'sending user creates linkage context data with System' 309, 'linkage created between sending user, System, and recipient user' 312, 'linkage tested and verdict returned' 315, 'if verdict returned="Subscribed," mailbox provider directs subscription email stream to recipient user's mailbox' 318, 'if verdict returned!="Subscribed," mailbox provider discards subscription email stream' 321, and/or 'to remove created linkage(s), process linkage destruction event(s)' 324.

The 'recipient user has access to mailbox at mailbox provider' 303 and 'sending user can send differentiated email streams to mailbox(es)' 306 steps typically may be precursor steps, which may be required for system 105 to operate properly. Typically, for the 303 step, a recipient user 175 should be able to access one or more specific recipient mailbox(es) 160 at a mailbox provider 125. Typically, such access by recipient user 175 to recipient mailbox 160 establishes proof that recipient user 175 maintains a direct relationship with recipient mailbox 160 such that recipient user 175 may be determined to be in verifiable possession of that recipient mailbox 160. This step is depicted, below, in FIG. 5A. In some implementations, however, these precursor steps may be entirely and/or partially ignored and/or skipped.

Typically, for the 306 step, a sending user 170 should be able to send differentiated email streams to mailbox provider(s) 125 and/or recipient mailbox(es) 160. The ability to differentiate email streams typically may allow sending user 170 to present a characterization of one or more particular email streams to mailbox providers 125 and/or recipient users 175. Thus, sending user 170 may send one or more email streams, and system 105 may distinguish, index, extract, and/or otherwise differentiate and process each individual stream. This step is depicted, below, in FIG. 5B.

In some implementations, however, steps 303 and/or 306 may be omitted partially and/or entirely. Thus, the 309 step would be the starting point for the FIG. 3A process flow.

The 'sending user creates linkage context data with System' 309 step typically may be performed as sending user 170 sends initial data to system 105 to act as a context for future email streams sent by sending user 170 containing the associated subscription email stream. This context data may include, but is not limited to, email stream descriptions, email stream identifying characteristics (Sender Policy Framework (SPF) domain/record, DomainKeys Identified Mail (DKIM) domain, Header-From domain, etc.), configuration information (confirmation link uniform resource locator (URL), Canonical Name (CNAME) record/delegation configuration for sending user's domain links, subdomain configuration data, Name Server (NS) records, Reverse DNS (rDNS) records/data, pointer (PTR) records/data, certificate (CERT) records, delegation name (DNAME) records, Key Fingerprint (e.g., SSHFP, TLSA, TKEY, etc.) records, etc.) and/or the like. System 105 receives this data and, in some implementations, produces one or more tokens that sending user 170 may insert into one or more matching/associated email messages. In some further implementations, the token(s) may be inserted into the email streams as a header (e.g., "X-System header," "X-TrustLinkage header," and/or the like).

The 'linkage created between sending user, System, and recipient user' 312 step typically may describe the creation of a trust linkage between a sending user 170 and a recipient user 175 with system 105, such that sending user 170 may be allowed to send a subscription email stream to 175. This step is described in greater detail below with reference to FIG. 3B.

The 'linkage tested and verdict returned' 315 step typically may describe the processing and verification of a trust linkage between a sending user 170 and a recipient user 175 for one or more sent email streams. This process includes aspects of sending subscription email streams to recipient user 175's recipient mailbox 160 at mailbox provider 125, testing the authenticity of the email stream's identifiers and/or header data by system 105, and system 105's returning of a verdict to mailbox provider 125 for processing the email stream. This step is described in greater detail below with reference to FIG. 3C.

The 'if verdict returned="Subscribed," mailbox provider directs subscription email stream to recipient user's mailbox' 318 and 'if verdict returned!="Subscribed," mailbox provider discards subscription email stream' 321 steps typically may describe the verdict output by system 105 after receiving and verifying email identifiers and headers as compared to one or more trust linkages on record with system 105. This step is described in greater detail below in FIG. 3C.

The 'to remove created linkage(s), process linkage destruction event(s)' 324 step typically may describe the mechanisms by which a trust linkage on system 105 may be destroyed, and thus by which a recipient user 175 may be unsubscribed from (i.e., no longer receive) sending user 170's email subscription streams. Four typical mechanisms for destroying trust linkages on system 105 are described below in FIGS. 8A-8D.

FIG. 3B depicts a second process flow chart associated with use of the trust linkage system 105, specifically creating trust linkages from the Linkage created between sending user, system, and recipient user' 312 step. As depicted in FIG. 3B, steps typically include 'recipient user requests subscription stream from sending user at mailbox' 327, 'sending user solicits subscription offer to recipient user' 330, 'sending user sends linkage initiation data to System' 333, 'System sends email to recipient user's mailbox' 336, 'recipient user clicks on System confirmation link' 339, 'System records confirmation opt-in data' 342, and/or 'receiving user may be navigated to System subscription UI/webpage' 345.

The 'recipient user requests subscription stream from sending user at mailbox' 327 and 'sending user solicits subscription offer to recipient user' 330 steps typically may begin the process of creating a trust linkage for system 105 between sending user 170 and recipient user 175. Typically, for steps 327 and 330, respectively, a recipient user 175 may request to receive one or more subscription email streams from a sending user 170 or sending user 170 may solicit one or more subscription to a recipient user 175. For example, recipient user 175 may click on an "Add me to the list!" button on sending user 170 website, enter recipient user 175's email address into a field on sending user 170's website, and/or any other mechanisms for joining sending user 170's emailing list. Alternatively, in the 330 step, sending user 170 may solicit recipient user 175 to join the emailing list by directly asking recipient user 175 to join, having a checkbox in a shopping cart checkout and/or account creation dialog, and/or any other mechanism for joining sending user 170's emailing list.

Once the recipient user 175's email has been added to sending user 170's emailing list, the 'sending user sends linkage initiation data to System' 333 step typically may commence. During the 333 step, sending user 170 typically sends system 105 linkage initiation data, which may include, but is not limited to, recipient user 175's email address, linkage context data from step 315, subscription details (e.g., time, IP address, etc.), and/or the like. This data typically may be used to verify an existing subscription context on system 105 associated with a subscription stream, record bits for verification and/or authentication, and/or the like. In some implementations, where the system 105 does not find a matching context, it may reject and/or ignore the request.

During the 'System sends email to recipient user's mailbox' 336 step, the system 105 forwards the subscription request to recipient user 175's specified recipient mailbox(es) 160 on mailbox provider 125. Within this subscription request, system typically may add, embed, and/or verify a return confirmation link directed back to system 105. The request may also include, but is not limited to, descriptions of the subscription stream, subscription management links, subscription initiation data (e.g., data, frequency, etc.), and/or the like.

After system 105 sends subscription request to recipient user 175's recipient mailbox(s) 160, the 'recipient user clicks on system confirmation link' 339 step typically may occur. The recipient user 175's clicking on the confirmation link within the subscription request typically may provide opt-in confirmation for that mailbox 160 to system 105. The confirmation link typically may be an HTML link, a button, and/or any other mechanism for redirecting recipient user 175's action back to system 105, such that the system 105 may uniquely recognize and/or process that action.

During the 'system records confirmation opt-in data' 342 step, after the recipient user 175's action is received by system 105, system 105 typically may record data associated with the click such as to uniquely recognize and/or locate that action. This data may include, but is not limited to, time, date, HTTP bits, stream ID, associated subscription stream, associated sending user 170, email client, IP address, and/or the like. This data, in some implementations, may be used to verify and/or authenticate later use by sending user 170 and/or receiving user 175 with system 105. In some further implementations, this data (and in some additional implementations, some or all of the data collected up to this point by system 105) may be concatenated, coded, tokenized, and/or otherwise represented as a unique identifier for use with system 105.

Additionally, in some implementations, after clicking on the confirmation link, recipient user 175 may be redirected in the 'receiving user may be navigated to System subscription UI/webpage' 345 step. For example, the link may include a programmatic call back to system 105 with the data for the 342 step, but may also open and/or generate a website 115 notifying recipient user 175 of the successful opt-in confirmation and/or displaying all subscriptions associated with the particular recipient user 175's recipient mailbox 160 (e.g., based on email address and/or the like) for informational purposes and/or management.

FIG. 3C typically depicts a third process flow chart associated with use of the trust linkage system, specifically testing trust linkages from above-step 315. FIG. 3C typically includes steps 'sending user sends differentiated email stream to specific mailbox at mailbox provider' 348, 'mailbox provider inspects/extracts email identifiers from email stream' 351, 'mailbox provider sends extracted identifiers to System for verification' 354, 'System compares sent identifiers to System records and calculates verdict' 357, 'Verdict="Unknown" where identifiers+header not meaningful to System' 360, 'Verdict="Invalid" where identifiers+header appear to be fraudulent' 363, 'Verdict="Unsubscribed" where identifiers+header associated with recipient user but subscription stream unsubscribed' 366, 'Verdict="Subscribed" where identifiers+header associated with recipient user and subscription stream currently subscribed' 369, 'System sends verdict to mailbox provider for processing' 372, and/or 'If verdict="Subscribed," send to mailbox; if verdict !="Subscribed," discard' 375.

During the 'sending user sends differentiated email stream to specific mailbox at mailbox provider' 348 step, sending user 170 typically may send one or more differentiated emails to recipient user 175's recipient mailbox(es) 160 at mailbox provider(s) 125. Included with this email stream typically may be a subscription stream (e.g., a newsletter, an advertisement, and/or the like), origination data (e.g., sending user 170's name and contact information, sending date, and/or the like), a system 105 header (e.g., X-System header, X-Service header, X-TrustLinkage header, and/or the like), and/or any other typical contents of an email stream and/or tracking configurations. In some implementations, one or more aspects of the email stream may be tokenized, obfuscated, and/or encrypted. For example, the X-System header may be a context data token, a trust linkage token, and/or any other mechanism for authentication and/or verification processing with system 105 and/or mailbox provider 125.

After sending the email stream, the 'mailbox provider inspects/extracts email identifiers from email stream' 351 step typically may receive the email stream and inspect/extract the contents. For example, this process may typically include reviewing/extracting HTTP bits, the SPF domain, the DKIM domain, Header-Footer data, X-System header, tokens, recipient user 175 address, and/or the like. Using this data, mailbox provider 125 queries system 105 for a verdict regarding the authenticity and/or subscription status of the email stream as associated with recipient user 175. In some implementations, the X-System header may prompt mailbox provider 125 to query System 105 for linkage confirmation.

During the 'mailbox provider sends extracted identifiers to System for verification' 354 step, mailbox provider 125 typically may send the extracted email stream data identifiers and/or X-System header data to system 105 for analysis. In some implementations, only a subset of this information may need to be sent to system 105 for verification (e.g., the X-System header, X-System token, and/or representative X-System header bits). In some further implementations, this data may be sent concatenated, encrypted, compressed, and/or otherwise altered as to increase obfuscation, security, bandwidth efficiency, and/or any other desired trait.

After receiving the sent data, the 'System compares sent identifiers to System records and calculates verdict' 357 step typically may involve system 105 comparing the sent data with trust linkages stored in system 105 (e.g., in system database(s) 165). In some implementations, system 105 may simply compare plaintext records, while in other implementations, system 105 may compare hashed, salted, cyclical redundancy check (CRC) valued, and/or otherwise encoded representations of the trust linkage. For example, system 105 may have on record joe@email.com+subscription@advertiser.com+subscribed, which may also be encoded as a hexademical value, a token (in some implementations with a CRC value and/or token), a salted value, and encrypted value, and/or any other mechanism for encoding data in a database for storage and recall. Once the system 105 receives and analyzes the value, for example of a token, and compares that value to what it has stored and associated with that value, the system 105 typically may output an authentication verdict.

Once analyzed and output, the output verdicts typically may be represented during 'Verdict="Unknown"' where identifiers+header not meaningful to System' 360, 'Verdict="Invalid"' where identifiers+header appear to be fraudulent' 363, 'Verdict="Unsubscribed"' where identifiers+header associated with recipient user but subscription stream unsubscribed' 366, and 'Verdict="Subscribed"' where identifiers+header associated with recipient user and subscription stream currently subscribed' 369 steps. These verdicts (i.e., unknown, invalid, unsubscribed, and subscribed) represent the general responses from system 105 to mailbox provider 125 based on comparing the email stream data and the stored trust linkage data; however, in some implementations, fewer or greater quantities of verdicts may be output. For example, in one implementation, system 105 may simply use a binary subscribed or not subscribed scheme, while in other implementations, system 105 may have tens or hundreds of verdicts based on differing levels of granularity. These levels of granularity may be beneficial, for example, where time limits are imposed on accounts, diagnostics are performed, multi-factor authentication may be used, and/or the like.

During the 'System sends verdict to mailbox provider for processing' 372 step, system 105 typically may send the output verdict to mailbox provider 125. Mailbox provider 125 may then use this verdict to process the received mail stream. Thus, during the 'If verdict="Subscribed," send to mailbox; if verdict !="Subscribed," discard' 375 step, the mailbox provider 125 may either accept the email stream (i.e., where the verdict="Subscribed") or otherwise discard the stream. In some further implementations, mailbox provider 125 may perform a multitude of alternative and/or additional actions, such as archiving the stream for future review (e.g., during flood and/or fraud analysis and/or heuristics), manual allowance by recipient user 175 (e.g., in a spam folder), and/or any other desired actions.

Figure 4:
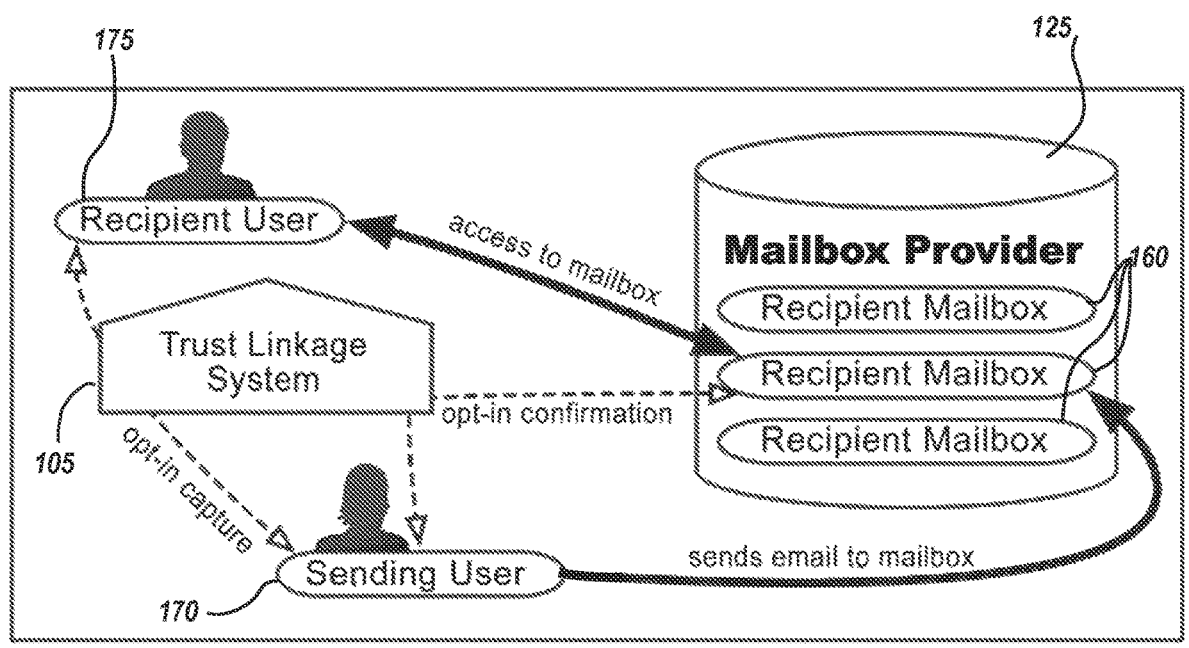
FIG. 4 depicts a block diagram flow chart of entity interaction for the trust linkage system.

FIG. 4 depicts a block diagram flow chart of entity interaction for the trust linkage system, typically including trust linkage system 105, mailbox providers 125, recipient mailbox(es) 160, sending user(s) 170, and/or recipient user(s) 175. As depicted in FIG. 4, trust linkage system 105 typically may act as a third-party intermediary between mailbox provider 125, sending user 170, and/or recipient user 175. As described elsewhere in this application, recipient user 175 typically may provide verified control of recipient mailbox(es) 160 by the ability to access these recipient mailbox(es) 160. Likewise, sending user 170 typically may interact with mailbox provider 125 and/or system 105 through the use of differentiated email streams. Opt-in confirmation (e.g., subscription stream confirmation email and link) typically may be sent from sending user 170 to trust linkage system 105, which may then forward and/or modify opt-in confirmation before sending the same to mailbox provider 125 and/or recipient mailbox 160. This email stream typically may be automatically accepted by mailbox provider 125 due to a trusted relationship between mailbox provider 125 and system 105, although in some implementations, a trust linkage (typically a wildcard-type) may be established between mailbox provider 125 and system 105. Recipient user 175 may then access recipient mailbox 160, retrieve confirmation email, and click on the opt-in confirmation link. The confirmation link typically may then redirected to system 105, confirmation details may be recorded and/or stored by system 105, and sending user 170 may then be notified of the opt-in confirmation's capture.

Figure 5A:
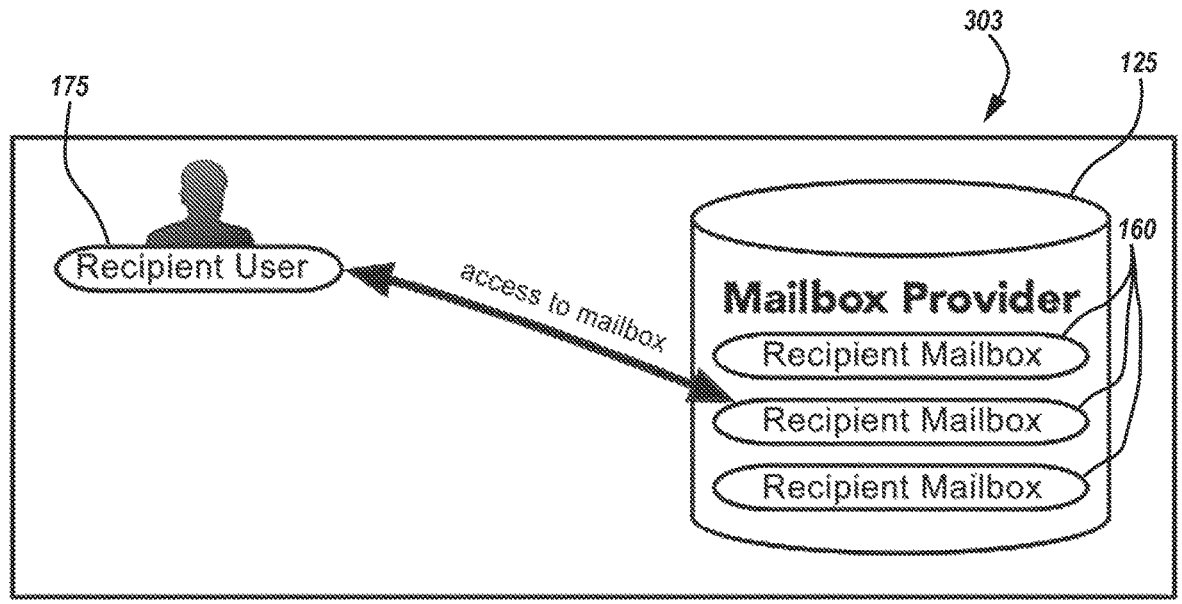
FIG. 5A depicts a first block diagram flow chart associated with trust linkage creation on trust linkage system.
Figure 5B:
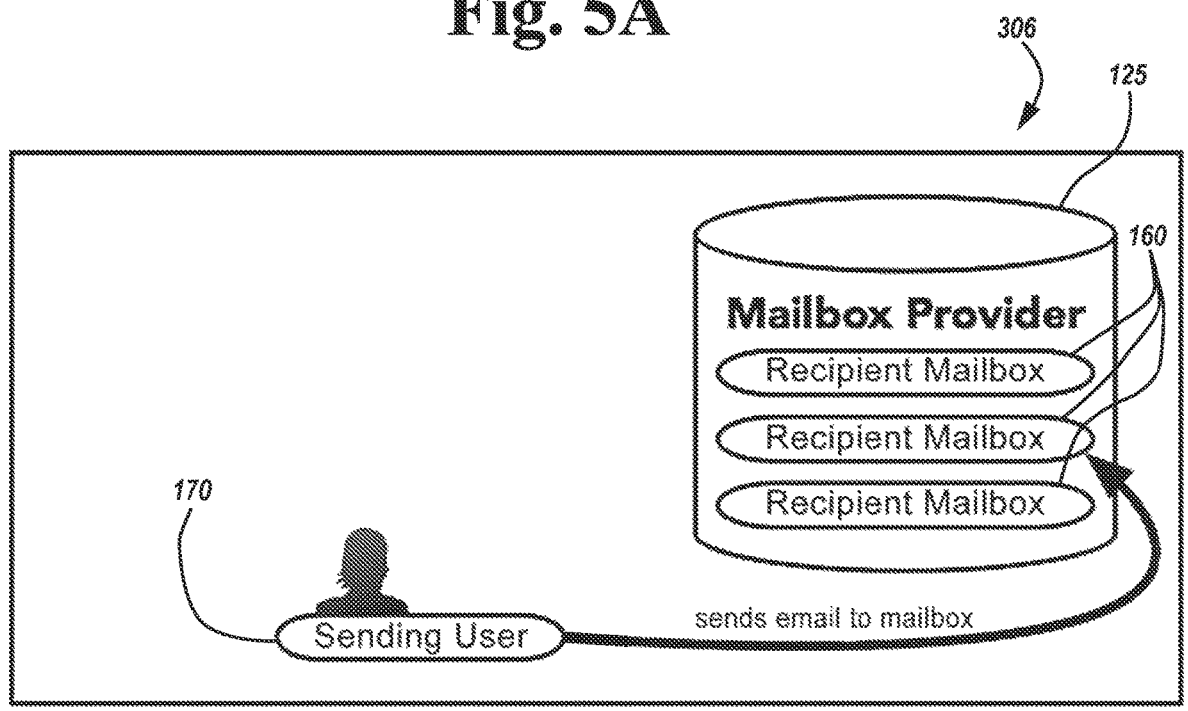
FIG. 5B depicts a second block diagram flow chart associated with trust linkage creation on trust linkage system.
Figure 5C:
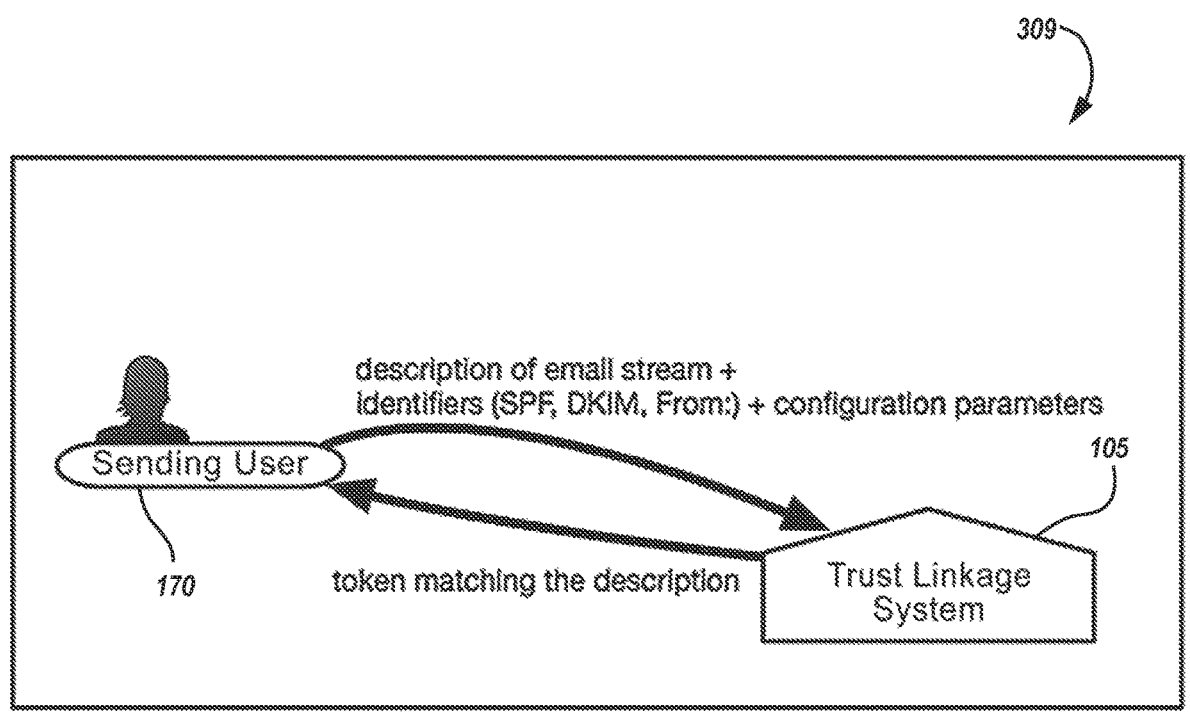
FIG. 5C depicts a third block diagram flow chart associated with trust linkage creation on trust linkage system.

FIGS. 5A-5C depict system 105 environment conditions that typically may be met before creating trust linkages with system 105. Specifically, FIG. 5A typically includes the interactions during 'recipient user has access to mailbox at mailbox provider' 303 step and includes mailbox providers 125, recipient mailbox(es) 160, and/or recipient user(s) 175. Typically, such access by recipient user 175 to recipient mailbox 160 establishes proof that recipient user 175 maintains a direct relationship with recipient mailbox 160 such that recipient user 175 may be determined to be in verifiable possession of that recipient mailbox 160.

FIG. 5B typically may depict the 'sending user can send differentiated email streams to mailbox(es)' 306 step and includes mailbox providers 125, recipient mailbox(es) 160, and/or sending user(s) 170. The ability to differentiate email streams typically may allow sending user 170 to present a characterization of one or more particular email streams to mailbox providers 125 and/or recipient users 175. Thus, sending user 170 may send one or more email streams, and system 105 may distinguish, index, extract, and/or otherwise differentiate and process each individual stream.

FIG. 5C typically may depict an overview block diagram flow chart associated with trust linkage creation on trust linkage system associated with 'sending user creates linkage context data with System' 309 step, described above, typically including trust linkage system 105 and/or sending user(s) 170. As described above, sending user 170 typically may supply context data to system 105 including, but not limited to, a description of the email stream, identifying information (SPF, DKIM, Headers, Footers, and/or the like), configuration parameters (e.g., specifying sender user 175's domain for links), and/or the like. System 105 typically may then process this context data for the email stream and provide a token and/or any other identifier mechanism to sending user 170 for identification of the email stream in the future.

Figure 6:
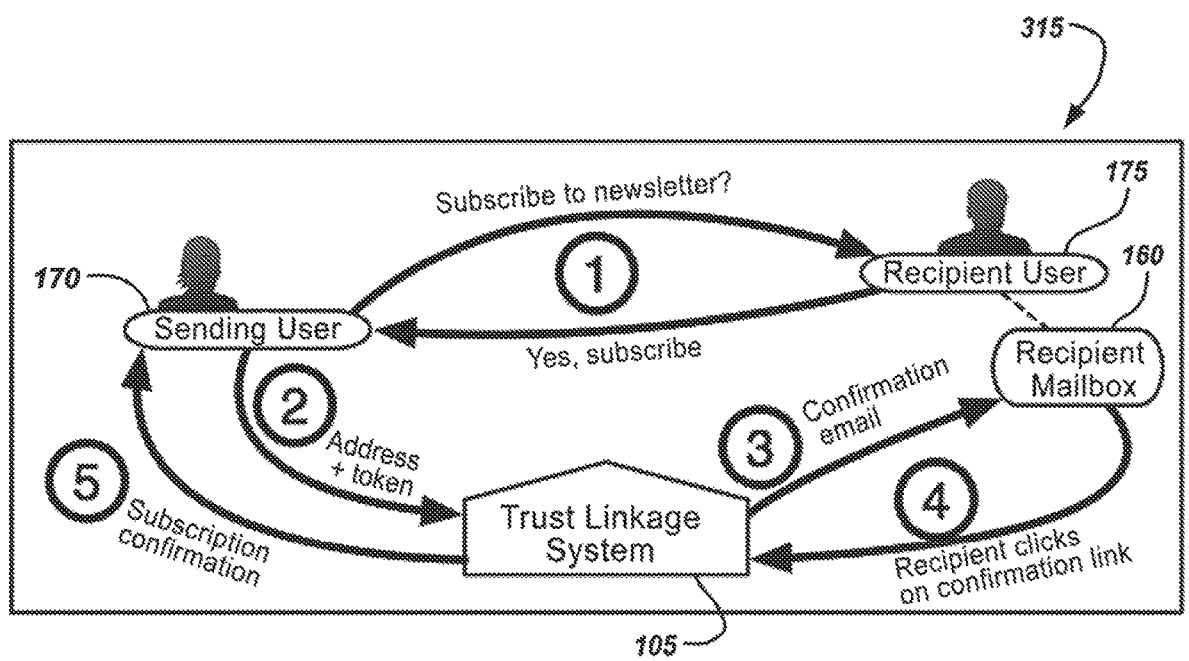
FIG. 6 depicts an overview block diagram flow chart associated with trust linkage creation on trust linkage system.

FIG. 6 depicts an overview block diagram flow chart associated with trust linkage creation on trust linkage system 105 during 'linkage created between sending user, System, and recipient user' 312 step and including trust linkage system 105, recipient mailbox(es) 160, sending user(s) 170, and/or recipient user(s) 175.

As described above in this application, and depicted in subarea "1," (represented by circled numeral "1"), sending user 170 first typically may solicit recipient user 175 to subscribe to a subscription stream (e.g., a newsletter), to which recipient user 175 may then reply to that solicitation. If in the affirmative, the process continues to subarea "2," if in the negative, the process halts. Alternatively, recipient user 175 may join sending user 170's subscription stream by requesting to join (e.g., entering email address into field on sending user 170's website, selecting "Subscribe me to offers" checkbox in account creation field, and/or the like).

In subarea "2," (represented by circled numeral "2"), sending user 170 may send an email stream containing a confirmation opt-in email with recipient user 175's email address and a subscription context token (created as described above) to system 105. System 105 may then receive the email, verify the email's contents (e.g., does email have confirmation link direct back to system 105), and then send the mail to recipient mailbox 160. In some implementations, system 105 may modify and/or supplement email. For example, system 105 may append to the end of the confirmation link at unique identifier, add a unique identifying token to verify authenticity on return, and/or any other desired aspect.

Further, in subarea "3," (represented by circled numeral "3"), the confirmation email containing the loopback confirmation link to system 105 is sent to recipient mailbox 160. As described elsewhere, this email may be automatically allowed to be sent to recipient mailbox 160 due to a trusted relationship between mailbox provider 125 and system 105, or a trust linkage may be established to allow the emails from system 105 to recipient mailbox(es) 160.

In subarea "4," (represented by circled numeral "4"), recipient user 175 may click on a confirmation link within the email, informing system 105 of recipient user 175's opt-in consent by clicking said confirmation link. System 105 typically may record/store this confirmation with additional data, such as time, date, IP address, mail client, unique bits, and/or the like. In some implementations, system 105 may also create an identifier (e.g., a token) representing this trust linkage that sending user 170 may then embed into an email stream for processing and/or authentication.

In subarea "5," (represented by circled numeral "5"), sending user 170 may be notified of the subscription confirmation from system 105. This may, for example, allow sending user 170 to maintain a list of email addresses that it believes to be active subscribers. Additionally, in some implementations, sending user 170 may receive a token associated with the trust linkage, which sending user 170 may embed into email streams to allow mailbox provider 125 and/or system 105 to process the stream and/or trust linkage.

Figure 7:
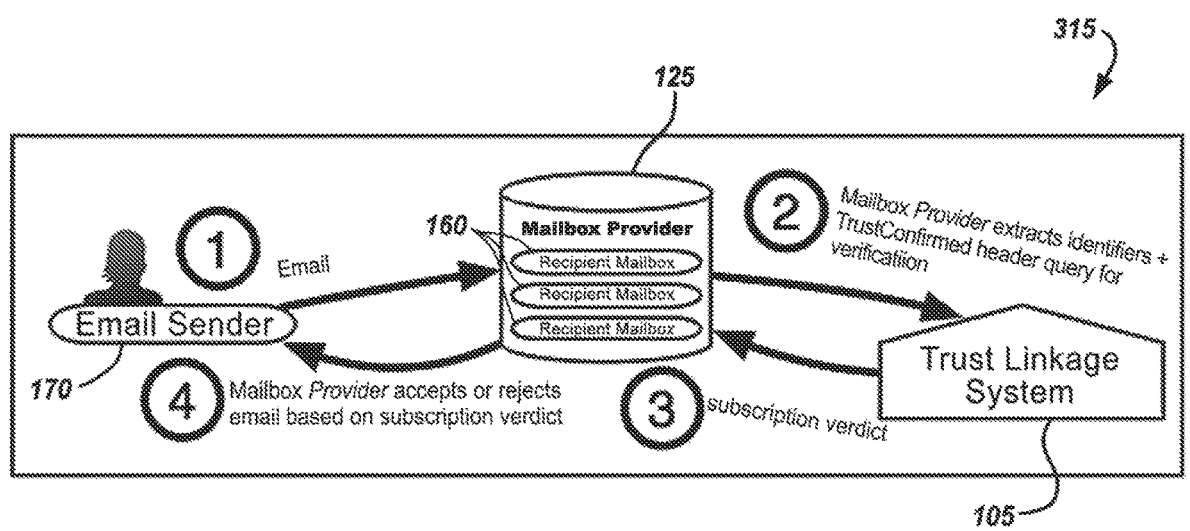
FIG. 7 depicts a block diagram flow chart associated with trust linkage testing on trust linkage system.

FIG. 7 depicts a block diagram flow chart associated with trust linkage testing on trust linkage system 105 during 'linkage tested and verdict returned' 315 step and typically includes trust linkage system 105, mailbox provider(s) 125, recipient mailbox(es) 160, and/or sending user 170.

As described above in this application, and depicted in subarea "1," (represented by circled numeral "1"), sending user 170 typically may send an email stream to mailbox provider 125. This email stream may typically contain identifiers (sending user 170, recipient user 175, subscription details, etc.) and headers (e.g., X-System header, etc.) for processing, authentication, and/or the like.

In subarea "2," (represented by circled numeral "2"), mailbox provider 125 receives the email stream from sending user 170, extracts the email identifiers and/or headers. Mailbox provider 125 typically may send this extracted data, as described above, to system 105 for verification and/or comparison to stored trust linkages.

Additionally, in subarea "3," (represented by circled numeral "3"), system 105 processes and analyzes the sent email data, comparing the data to trust linkage records stored with system 105, and then outputs one or more subscription verdicts. System 105 then sends the verdict(s) back to mailbox provider 125 for review and processing with regard to the email. These verdicts, as described elsewhere in this application, typically may be unknown, invalid, unsubscribed, and/or subscribed.

In subarea "4," (represented by circled numeral "4"), mailbox provider 125 processes sending user 170's email stream. Typically, if system 105 returns a "subscribed" verdict, mailbox provider 125 passes the email stream to recipient user 175's recipient mailbox 160. Recipient user 175 may then view the subscription email.

FIGS. 8A-8D depict block diagram flow charts associated with trust linkage destruction on trust linkage system 105 during 'to remove created linkage(s), process linkage destruction event(s)' 324 step, typically including trust linkage system 105, mailbox provider 125, recipient mailbox(es) 160, sending user 170, and/or recipient user 175.

Figure 8A:
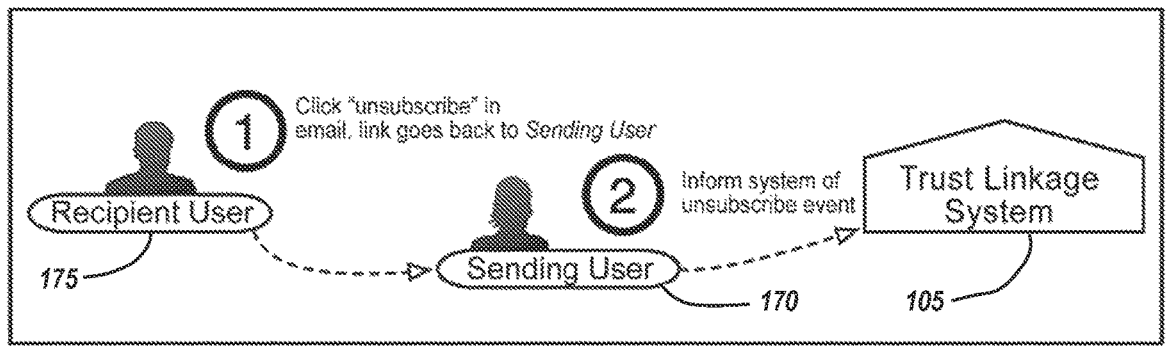
FIG. 8A depicts a first block diagram flow chart associated with trust linkage destruction on trust linkage system.

FIG. 8A depicts a first linkage destruction mechanism, typically including recipient user 175, sending user 170, and/or system 105. During this mechanism, recipient user 175 informs sending user 170 to unsubscribe recipient user 175 from one or more subscription streams. For example, recipient user 175 may click on an unsubscribe link in an email footer, which informs the sending user 170 of the request for unsubscription (e.g., via PHP, API, HTML call, etc.), and then the sending user 170 may then inform system 105 to deactivate and/or remove the trust linkage.

Figure 8B:
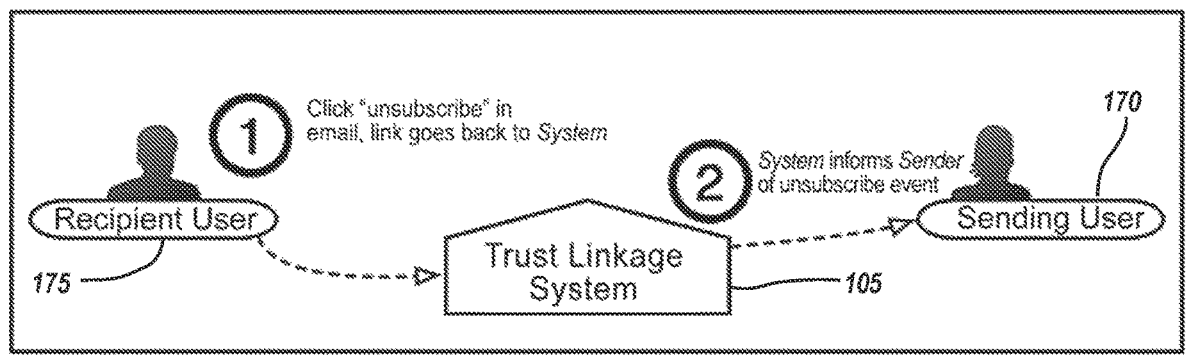
FIG. 8B depicts a second block diagram flow chart associated with trust linkage destruction on trust linkage system.

Further, FIG. 8B depicts a second linkage destruction mechanism, typically including recipient user 175, system 105, and/or sending user 170. During this mechanism, recipient user 175 informs system 105 to unsubscribe the recipient user 175, after which system 105 informs sending user 170 of the unsubscribe event. For example, recipient user 175 sends a request to system 105 (e.g., via email footer link directed to system 105 and identifying email stream from which to unsubscribe), system 105 deactivates and/or removes the trust linkage, and then system 105 may inform sending user 170 of the unsubscribe event.

Figure 8C:
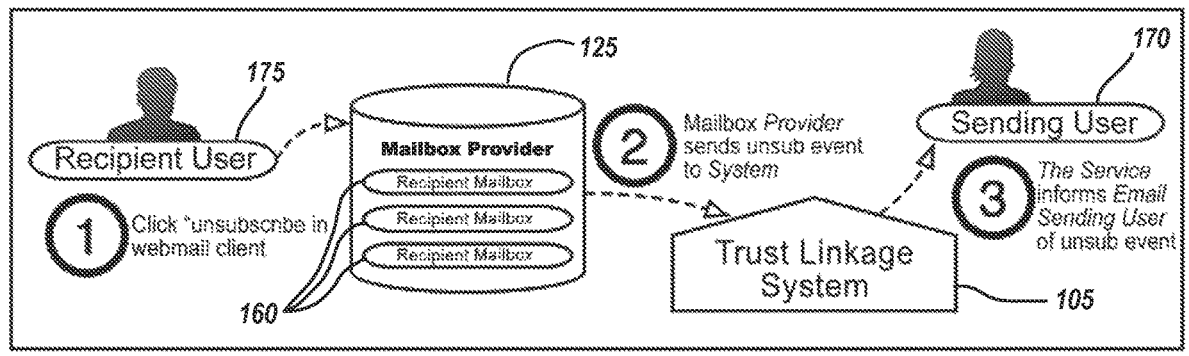
FIG. 8C depicts a third block diagram flow chart associated with trust linkage destruction on trust linkage system.

Additionally, FIG. 8C depicts a third linkage destruction mechanism, typically including recipient user 175, mailbox provider 125, recipient mailbox(es) 160, trust linkage system 105, and/or sending user 170. During this mechanism, recipient user 175 accesses a subscription management user interface (UI) provided by mailbox provider 125. Once there, recipient user 175 may click unsubscribe on one or more subscriptions to request unsubscription event(s). Mailbox provider 125 may then inform system 105 of the unsubscription event, and system 105 deactivates and/or removes the trust linkage. System 105 may then inform sending user 170 of the unsubscribe event.

Figure 8D:
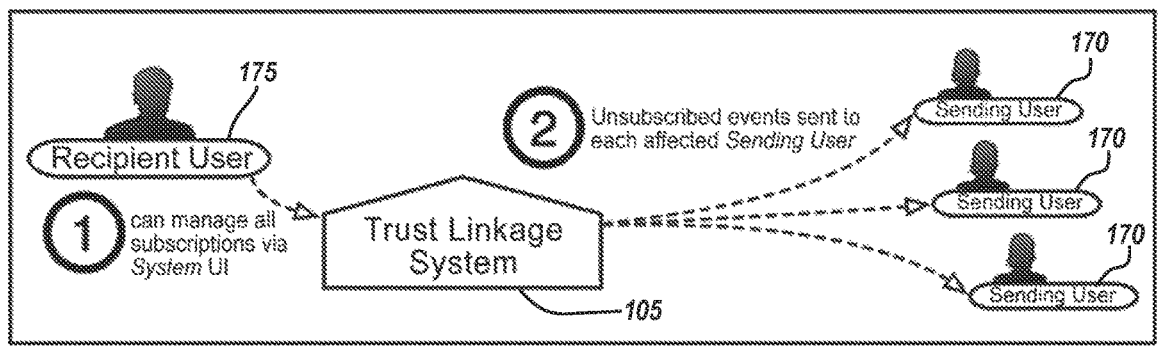
FIG. 8D depicts a fourth block diagram flow chart associated with trust linkage destruction on trust linkage system.

Further still, FIG. 8D depicts a fourth linkage destruction mechanism, typically including recipient user 175, trust linkage system 105, and/or sending user(s) 170. During this mechanism, recipient user 175 typically may access a subscription management UI on system 105 and request unsubscription events on one or more subscriptions associated with the recipient user 175. System 105 may then deactivate and/or remove the trust linkage, and then system 105 may inform sending user(s) 170 of the unsubscribe event(s).

Figure 9:
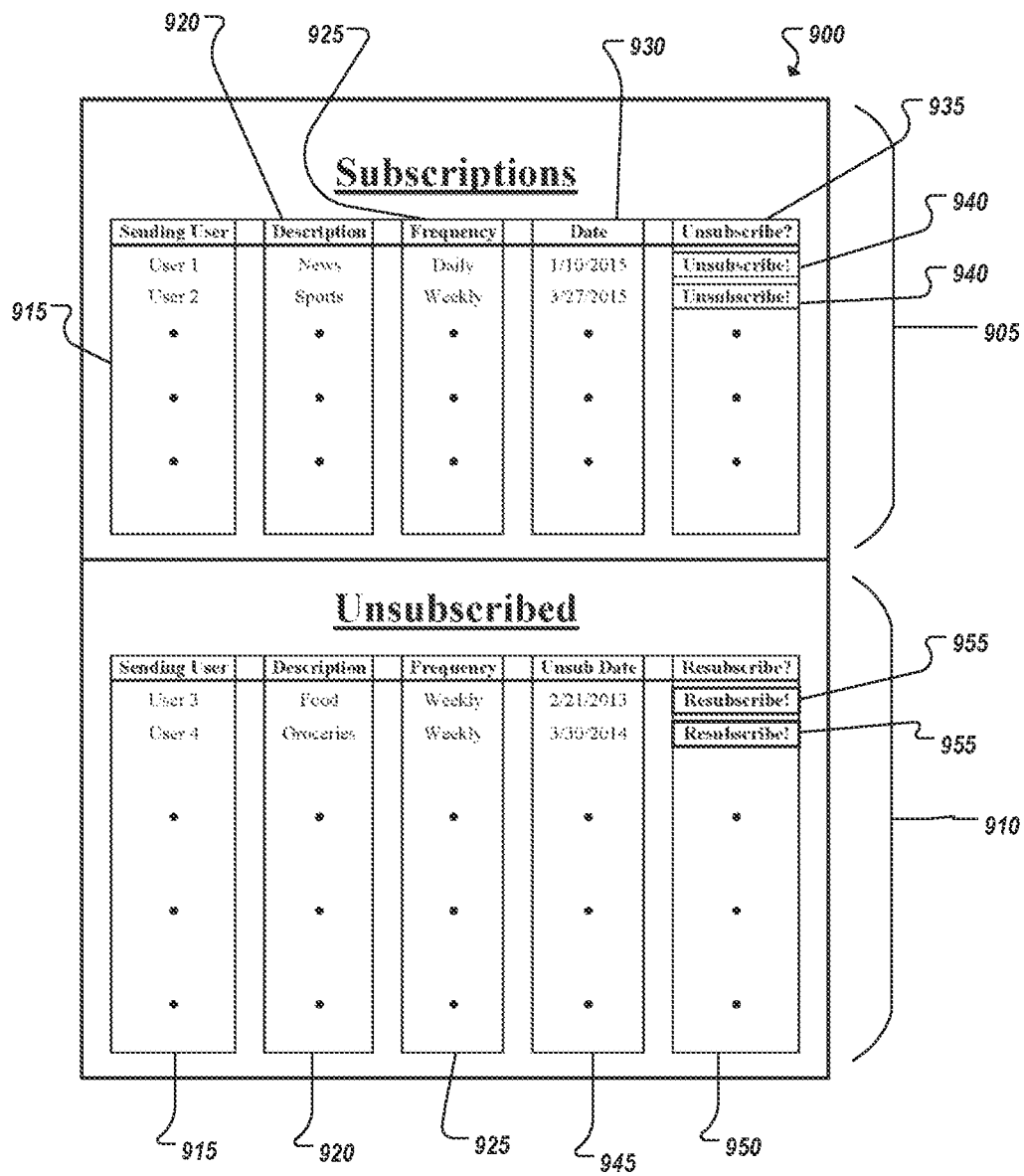
FIG. 9 depicts a user interface associated with trust linkage system.

FIG. 9 depicts a user interface associated with trust linkage system, typically including user interface (UI) 900, subscriptions section 905, unsubscribed section 910, sending user field 915, description field 920, frequency field 925, date field 930, unsubscription field 935, unsubscribe indicator 940, unsubscription date field 945, resubscription field 950, and/or resubscribe indicator 955.

UI 900 typically may provide system 105 user with one or more graphical interfaces to manage system 105 parameters, which typically may be subscriptions available to user on system 105. Subscriptions section 905 typically may list one or more subscriptions that system 105 user may currently be subscribed to and typically may include sending user field 915, description field 920, frequency field 925, date field 930, unsubscription field 935, and/or unsubscribe indicator 940. Unsubscribed section 910 typically may list one or more subscriptions that system 105 user may have previously subscribed to, but which are currently unsubscribed (i.e., due to recipient user 175 and/or sending user 170 temporarily and/or permanently breaking trust linkage) and typically may include unsubscription date field 945, resubscription field 950, and/or resubscribe indicator 955.

Typically, one or more system 105 users may connect to UI 900 via one or more websites 115 and via one or more user devices 120. UI 900 typically may be directly and/or indirectly located digitally on system 105, while in other implementations UI 900 may be located digitally anywhere in environment 100 (e.g., at mailbox providers 125, installed as local application on one or more user devices 120, and/or the like).

UI 900 users typically may view one or more subscriptions in subscriptions section 905 and one or more deprecated subscriptions in unsubscribed section 910. In other implementations, however, subscriptions section 905 and/or unsubscribed section 910 may have an empty subset. For example, a user that is new to system 105 may not have any subscription steams in system 105 yet for subscriptions section 105 and/or may not have deactivated any subscriptions to populate unsubscribed section 910.

Typically, when subscriptions section 905 may be populated with a nonempty subset (i.e., one or more subscription streams), subscriptions section 905 of UI 900 typically may include sending user field 915, description field 920, frequency field 925, date field 930, unsubscription field 935, and/or unsubscribe indicator 940.

Typically, each row of subscriptions section 905 may include one subscription stream and having one or more fields, typically each field, populated. For example, as depicted in FIG. 9, the first depicted row may correspond to "User 1" in sending user field 915, "News" in description field 920, "Daily" in frequency field 925, and "1-10-2015" in date field 930. These data points typically may describe aspects of the respective subscription stream. For the above-described first-depicted row, this stream may indicate that a daily news subscription from user 1, where the subscription was originally added and/or verified in system 105 on Jan. 10, 2015. Other fields may, of course, be added, removed, and/or altered based on the desire of system 105 and/or system 105 user.

Typically, in unsubscription field 935, each row of subscriptions section 905 may include one or more, more typically one, unsubscribe indicator 940. This indicator 940 typically may be a clickable link, icon, button, and/or other interaction mechanism. Upon interaction by user with unsubscribe indicator 940 (i.e., by clicking, tapping, and/or otherwise interacting), UI 900 typically may communicate user's desire to unsubscribe from the respective subscription stream. UI 900 typically may communicate with system 105, mailbox provider 125, and/or other environment 100 entity that may affect such unsubscription change with system 105. For example, UI 900 may interact with system 105 via an HTTP, JAVA, JAVASCRIPT, API, and/or any other mechanism for transmission of data query, request, and/or update. In some further implementations, UI 900 typically may present user with a generated message and/or graphic requesting confirmation of unsubscription. For example, such generated message and/or graphic may be a popup window stating "Are you sure you want to unsubscribe from this email stream," to which the user typically may interact with the popup to confirm the unsubscription (e.g., by clicking a button labeled "Yes, unsubscribe me").

After interacting with unsubscribe indicator 940, system 105 and/or other entity may deactivate and/or otherwise remove trust linkage between the respective subscription stream and the requesting use; this user typically may be recipient user 175, but in some implementations, sending user 170 may use UI 900 to remove one or more trust linkages. The respective subscription stream typically may then be moved to the subset in unsubscribed section 910 and data associated with the unsubscription action may be stored on system 105 and/or other environment 100 entity (e.g., the date and/or time of the unsubscription event).

Similar to subscriptions section 905, when unsubscribed section 910 may be populated with a nonempty subset, unsubscribed section 910 of UI 900 typically may include sending user field 915, description field 920, unsubscription date field 945, resubscription field 950, and/or resubscribe indicator 955.

Typically, each row of unsubscribed section 910 may include one unsubscribed subscription stream and having one or more fields, typically each field, populated. For example, as depicted in FIG. 9, the first row may have "User 3" in sending user field 915, "Food" in description field 920, and/or "12/10/2014" in unsubscription date field 945. These data points typically may describe aspects of the respective unsubscribed subscription stream. For the above-described first-depicted row, this stream may indicate that a food subscription from user 3, where the subscription was unsubscribed on Dec. 10, 2014. Other fields may, of course, be added, removed, and/or altered based on the desire of system 105 and/or system 105 user.

Typically, in resubscription field 950, each row of unsubscribed section 910 may include one or more, more typically one, resubscribe indicator 955. This indicator 955 typically may be a clickable link, icon, button, and/or other interaction mechanism. Upon interaction by user with resubscribe indicator 955 (i.e., by clicking, tapping, and/or otherwise interacting), UI 900 typically may communicate user's desire to resubscribe to the respective subscription stream. UI 900 typically may communicate with system 105, mailbox provider 125, and/or other environment 100 entity that may affect such resubscription event with system 105. For example, UI 900 may interact with system 105 via an HTTP, JAVA, JAVASCRIPT, API, and/or any other mechanism for transmission of data query, request, and/or update. In some further implementations, UI 900 typically may present user with a generated message and/or graphic requesting confirmation of resubscription. For example, such generated message and/or graphic may be a popup window stating "Are you sure you want to resubscribe to this email stream," to which the user typically may interact with the popup to confirm the resubscription (e.g., by clicking a button labeled "Yes, resubscribe me").

After interacting with resubscribe indicator 955, system 105 and/or other entity may deactivate and/or otherwise revive and/or initiate a new trust linkage creation procedure (described above in this application) for trust linkage between the respective subscription stream and the requesting use. Again this user typically may be recipient user 175, but in some implementations, sending user 170 may use UI 900 to renew/reinitiate creation of one or more trust linkages. The respective subscription stream typically may then be moved to the subset in subscriptions section 905 and data associated with the resubscription action may be stored on system 105 and/or other environment 100 entity (e.g., the date and/or time of the resubscription event).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system 105 components in the embodiments described above should not be understood as requiring such separation in all embodiments, and it should be understood that the described program components and systems may typically be integrated together in a single hardware and/or software product or packaged into multiple hardware and/or software products.

Thus, particular embodiments of the subject matter have been described. Other embodiments are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for establishing a third-party documented trust linkage over a computer network, comprising the steps of:
   receiving linkage context data at a trust linkage system from a sending user;
   creating a linkage context using the trust linkage system based on the linkage context data;
   sending the linkage context from the trust linkage system back to the sending user;
   receiving linkage initiation data at the trust linkage system from the sending user;
   sending a linkage initiation email from the trust linkage system to a recipient user via a mailbox provider based on the linkage initiation data;
   receiving confirmation opt-in data in response to the linkage initiation email from the recipient user at the trust linkage system; and
   creating a trust linkage by the trust linkage system between the sending user and the recipient user,
   wherein an identifier representing the trust linkage is embedded into an email stream of the sending user;
   wherein the mailbox provider queries the trust linkage system to confirm existence of the trust linkage between the sending user and the recipient user prior to determining whether to send an email to the recipient user or discard the email;
   wherein the trust linkage allows the sending user to successfully send at least one future message stream associated with the linkage context data;
   wherein the trust linkage allows the recipient user to successfully receive the at least one future message stream associated with the linkage context data; and
   wherein the trust linkage system ensures that the recipient user verifiably requested the at least one future message stream and the sending user verifiably sent the at least one future message stream;
   wherein the method further includes:
   receiving the identifier;
   testing the identifier to the trust linkage to yield a result;
   calculating a verdict based on the result;
   sending the verdict to the mailbox provider; and
   providing a user interface to manage the trust linkage;
   wherein the verdict determines how the mailbox provider will process the at least one future message stream.

2. The method of claim 1, wherein:
   the sending user comprises a plurality of sending users;
   the recipient user comprises a plurality of recipient users; and
   the trust linkage comprises a plurality of trust linkages.

3. The method of claim 1, wherein the identifier comprises a plurality of identifiers and the verdict comprises a plurality of verdicts.

4. The method of claim 1, wherein the verdict is considered subscribed wherein the identifier is associated with the recipient user and wherein the recipient user has an existing trust linkage associated with the identifier.

5. The method of claim 1, further comprising the step of: creating a tokenized linkage context.

6. The method of claim 1, further comprising the step of: creating a tokenized trust linkage.

7. The method of claim 1, further comprising the steps of: receiving a request to destroy a trust linkage; and destroying the trust linkage.

8. A system for establishing a third-party documented trust linkage system over a computer network configured to operate over a network using a hardware-derived server, a recipient user, and a sending user, comprising:
   the server operating the third-party documented trust linkage system, the server adapted to communicate with a network;

wherein the server is configured to:
receive linkage context data at a trust linkage system from the sending user;
create a linkage context using the trust linkage system associated with the linkage context data;
send the linkage context from the trust linkage system back to the sending user;
receive linkage initiation data at the trust linkage system from the sending user;
send linkage initiation email from the trust linkage system to the recipient user via a mailbox provider based on the linkage initiation data;
receive confirmation opt-in data in response to the linkage initiation email from the recipient user at the trust linkage system; and
create a trust linkage by the trust linkage system between the sending user and the recipient user,
wherein an identifier representing the trust linkage is embedded into an email stream of the sending user;
wherein the mailbox provider queries the trust linkage system to confirm existence of the trust linkage between the sending user and the recipient user prior to determining whether to send an email to the recipient user or discard the email;
wherein the trust linkage allows the sending user to successfully send at least one future message stream associated with the linkage context data;
wherein the trust linkage allows the recipient user to successfully receive the at least one future message stream associated with the linkage context data; and
wherein the trust linkage system ensures that the recipient user verifiably requested the at least one future message stream and the sending user verifiably sent the at least one future message stream;
wherein in the server is further configured to:
  receiving the identifier;
  testing the identifier to the trust linkage to yield a result;
  calculating a verdict based on the result;
  sending the verdict to the mailbox provider; and
  providing a user interface to manage the trust linkage;
wherein the verdict determines how the mailbox provider will process the at least one future message stream.

9. The system of claim 8, wherein:
the sending user comprises a plurality of sending users;
the recipient user comprises a plurality of recipient users; and
the trust linkage comprises a plurality of trust linkages.

10. The system of claim 8, wherein the identifier comprises a plurality of identifiers and the verdict comprises a plurality of verdicts.

11. The system of claim 8, wherein the verdict is considered subscribed wherein the identifier is associated with the recipient user and wherein the recipient user has an existing trust linkage associated with the identifier.

12. The system of claim 8, wherein the server is further configured to:
create a tokenized linkage context.

13. The system of claim 8, wherein the server is further configured to:
create a tokenized trust linkage.

14. The system of claim 8, wherein the server is further configured to:
receive a request to destroy a trust linkage; and
destroy the trust linkage.

15. A nontransitory, computer-readable medium having instructions stored thereon, which when executed by one or more computers, causes the one or more computers to:
receive linkage context data at a trust linkage system from a sending user;
create a linkage context using the trust linkage system based on the linkage context data;
send the linkage context from the trust linkage system back to the sending user;
receive linkage initiation data at the trust linkage system from the sending user;
send linkage initiation email from the trust linkage system to a recipient user via a mailbox provider based on the linkage initiation data to the recipient user;
receive confirmation opt-in data in response to the linkage initiation email from the recipient user; and
create a trust linkage by the trust linkage system between the sending user and the recipient user,
wherein an identifier representing the trust linkage is embedded into an email stream of the sending user;
wherein the mailbox provider queries the trust linkage system to confirm existence of the trust linkage between the sending user and the recipient user prior to determining whether to send an email to the recipient user or discard the email;
wherein the trust linkage allows the sending user to successfully send at least one future message stream associated with the linkage context data;
wherein the trust linkage allows the recipient user to successfully receive the at least one future message stream associated with the linkage context data;
wherein the trust linkage system ensures that the recipient user verifiably requested the at least one future message stream and the sending user verifiably sent the at least one future message stream; and
wherein the instructions cause the computer to:
  receive the identifier;
  test the identifier to the trust linkage to yield a result;
  calculate a verdict based on the result;
  send the verdict to the mailbox provider; and
  provide a user interface to manage the trust linkage;
wherein the verdict determines how the mailbox provider will process the at least one future message stream;
wherein the identifier comprises a plurality of identifiers and the verdict comprises a plurality of verdicts.

* * * * *